(12) United States Patent
Ponte et al.

(10) Patent No.: US 12,001,084 B2
(45) Date of Patent: Jun. 4, 2024

(54) FOLDABLE EYEGLASSES AND CASE

(71) Applicant: THINOPTICS, INC., San Jose, CA (US)

(72) Inventors: Gad Ponte, Palo Alto, CA (US); Tadmor Shalon, Palo Alto, CA (US)

(73) Assignee: Thinoptics, Inc., San Jose, CA (US)

( * ) Notice: Subject to any disclaimer, the term of this patent is extended or adjusted under 35 U.S.C. 154(b) by 776 days.

(21) Appl. No.: 17/049,985

(22) PCT Filed: Apr. 26, 2019

(86) PCT No.: PCT/US2019/029429
§ 371 (c)(1),
(2) Date: Oct. 23, 2020

(87) PCT Pub. No.: WO2019/210222
PCT Pub. Date: Oct. 31, 2019

(65) Prior Publication Data
US 2021/0080748 A1 Mar. 18, 2021

Related U.S. Application Data

(60) Provisional application No. 62/663,156, filed on Apr. 26, 2018.

(51) Int. Cl.
*G02C 5/08* (2006.01)
*A45C 1/06* (2006.01)
(Continued)

(52) U.S. Cl.
CPC .................. *G02C 5/08* (2013.01); *A45C 1/06* (2013.01); *A45C 11/04* (2013.01); *G02C 5/006* (2013.01);
(Continued)

(58) Field of Classification Search
None
See application file for complete search history.

(56) References Cited

U.S. PATENT DOCUMENTS 232,493 A  *  9/1880  No Hauck ............. A45C 11/04
                                                   206/6
261,799 A      7/1882  Woodward
(Continued)

FOREIGN PATENT DOCUMENTS

CN     101711374 A    5/2010
CN     201597163 U   10/2010
(Continued)

OTHER PUBLICATIONS

Shalon et al.; U.S. Appl. No. 18/168,464 "Ultra thin folding glasses and storage device," filed May 13, 2023.
(Continued)

*Primary Examiner* — Darryl J Collins
(74) *Attorney, Agent, or Firm* — Shay Glenn LLP

(57) ABSTRACT

An eyewear system may be eyeglasses and a case, the eyeglasses may be a first lens, a second lens, and a bendable bridge disposed between the first lens and second lens, the bendable bridge may be a spring providing a spring force when the bridge is bent from a rest position, the eyeglasses being adapted to move from a wearable configuration in which the bendable bridge is in a rest position and the first lens and second lens are in a first configuration to a stored configuration in which the first and second lenses are moved towards one another relative to the first configuration, the bendable bridge being bent from its rest position in the stored configuration, the case may be a door and an opening through which the eyeglasses pass during insertion and guides sized and configured with respect to the eyeglasses to engage and move the first lens towards the second lens against spring force of the bridge to the stored configuration (Continued)

during insertion of the eyeglasses and closing of the door, wherein the case may be a thickness of less than about 5 mm and a length of less than about 90 mm.

35 Claims, 19 Drawing Sheets

(51) Int. Cl.
    *A45C 11/04*     (2006.01)
    *G02C 5/00*     (2006.01)
    *G02C 5/06*     (2006.01)
    *A45C 11/00*     (2006.01)

(52) U.S. Cl.
    CPC .......... *G02C 5/06* (2013.01); *A45C 2001/065* (2013.01); *A45C 2011/002* (2013.01)

(56) References Cited

U.S. PATENT DOCUMENTS

| | | |
|---|---|---|
| 272,450 A | 2/1883 | Manning |
| 353,203 A | 11/1886 | Chase |
| 380,491 A | 4/1888 | Kahn |
| 470,029 A | 3/1892 | Wood |
| 529,988 A | 11/1894 | Wood |
| 541,767 A | 6/1895 | Lloyd |
| 574,523 A | 1/1897 | Crauss |
| 585,619 A | 6/1897 | Cottet, Jr. |
| 677,996 A | 7/1901 | Kleinert |
| 683,417 A | 9/1901 | Weinstein |
| 942,480 A | 12/1909 | Bradshaw |
| 1,017,579 A | 2/1912 | Nicol |
| D49,217 S | 6/1916 | King |
| 1,363,689 A * | 12/1920 | Styll ............... A61F 9/025 351/126 |
| 1,919,262 A | 7/1933 | Shields |
| 1,919,938 A | 7/1933 | Fielding |
| 1,931,634 A | 10/1933 | Tanasso et al. |
| 1,970,044 A | 8/1934 | Klein |
| 2,004,445 A | 6/1935 | Meyer |
| 2,023,469 A | 12/1935 | Grier |
| 2,036,591 A | 4/1936 | Marciano |
| 2,047,646 A | 7/1936 | Nerney |
| 2,061,411 A | 11/1936 | Tanasso et al. |
| 2,187,177 A | 1/1940 | Schuz |
| 2,234,729 A | 3/1941 | Montalvo-Guenard |
| 2,301,182 A | 11/1942 | Kaser |
| 2,323,518 A | 7/1943 | Cochran |
| 2,478,921 A | 8/1949 | Hansen |
| 2,537,248 A | 1/1951 | Vigano |
| 2,719,565 A | 10/1955 | Wolff |
| 2,811,897 A | 11/1957 | Belgard |
| 2,975,426 A | 3/1961 | Rabb |
| 3,085,584 A | 4/1963 | Hollinger |
| 3,323,638 A | 6/1967 | Dishart |
| D209,016 S | 10/1967 | Weissman |
| 3,395,964 A | 8/1968 | Nieder |
| D220,597 S | 4/1971 | Dawson et al. |
| 4,018,515 A | 4/1977 | Derkas |
| D247,111 S | 1/1978 | Olivan |
| 4,255,024 A | 3/1981 | De Monts et al. |
| 4,577,942 A | 3/1986 | Frieder et al. |
| 4,600,279 A | 7/1986 | Tabacchi |
| D289,122 S | 4/1987 | Meyer et al. |
| 4,772,112 A | 9/1988 | Zider et al. |
| 4,840,476 A | 6/1989 | Rooney |
| D305,478 S | 1/1990 | Lahm et al. |
| 4,896,955 A | 1/1990 | Zider et al. |
| 4,924,245 A | 5/1990 | Dianitsch |
| 5,015,087 A | 5/1991 | Baratelli |
| D318,949 S | 8/1991 | Mawhinney et al. |
| D322,262 S | 12/1991 | Manus |
| D330,456 S | 10/1992 | Lehman |
| D343,402 S | 1/1994 | Scoppettone |
| 5,335,026 A | 8/1994 | Kato et al. |
| 5,369,451 A | 11/1994 | Tamagawa |
| 5,431,506 A | 7/1995 | Masunaga |
| 5,448,317 A | 9/1995 | Huang |
| 5,452,028 A | 9/1995 | Iijima |
| D363,603 S | 10/1995 | Leveen et al. |
| D371,679 S | 7/1996 | Nejman |
| D379,558 S | 6/1997 | Mischenko et al. |
| 5,646,707 A | 7/1997 | Arnette |
| 5,654,785 A | 8/1997 | Shih et al. |
| 5,748,280 A | 5/1998 | Herman |
| D397,551 S | 9/1998 | Shefler |
| D407,591 S | 4/1999 | Bolognia et al. |
| 5,929,966 A | 7/1999 | Conner |
| D414,036 S | 9/1999 | Conway |
| 5,949,515 A | 9/1999 | Hoshino |
| D418,857 S | 1/2000 | Paulsen et al. |
| 6,017,119 A | 1/2000 | Huang |
| 6,026,950 A | 2/2000 | Wisniewski |
| D421,526 S | 3/2000 | Isaacson |
| 6,053,309 A | 4/2000 | Lin |
| 6,077,368 A | 6/2000 | Nakamura et al. |
| D428,253 S | 7/2000 | Huang |
| D430,393 S | 9/2000 | Conway |
| D430,727 S | 9/2000 | Wisniewski |
| D435,340 S | 12/2000 | Kojoori |
| 6,158,860 A | 12/2000 | Huang |
| D436,613 S | 1/2001 | Chao |
| D438,904 S | 3/2001 | Reynolds |
| 6,210,004 B1 | 4/2001 | Horikawa et al. |
| 6,264,326 B1 | 7/2001 | Hyoi |
| D446,237 S | 8/2001 | Koevari |
| D451,119 S | 11/2001 | Koevari |
| D451,674 S | 12/2001 | Leins |
| 6,357,873 B1 | 3/2002 | Spindelbalker |
| 6,371,614 B1 | 4/2002 | Herman |
| 6,530,659 B1 * | 3/2003 | Marcum ............... G02C 5/008 351/158 |
| 6,530,660 B1 | 3/2003 | Chao et al. |
| 6,641,260 B1 | 11/2003 | Avital |
| 6,773,106 B2 | 8/2004 | Herman |
| 6,814,226 B2 | 11/2004 | Chao |
| D503,087 S | 3/2005 | Dzwill et al. |
| D507,871 S | 8/2005 | DiMarchi et al. |
| D515,805 S | 2/2006 | Jones |
| D518,636 S | 4/2006 | Sievers |
| D527,891 S | 9/2006 | Hoeksema |
| 7,117,990 B2 | 10/2006 | Sharif |
| 7,287,851 B2 * | 10/2007 | Amioka ............... G02C 5/006 351/114 |
| D555,900 S | 11/2007 | Pippin |
| 7,452,070 B2 | 11/2008 | Oskarsson |
| D585,471 S | 1/2009 | Thompson |
| 7,484,843 B1 | 2/2009 | Lin |
| 7,637,610 B2 | 12/2009 | Graffia |
| 7,748,843 B2 | 7/2010 | Stewart |
| D631,246 S | 1/2011 | Boettner |
| 7,905,591 B2 | 3/2011 | Strobel |
| D651,799 S | 1/2012 | Dial |
| D653,656 S | 2/2012 | Charnas et al. |
| D669,082 S | 10/2012 | Sato |
| D684,367 S | 6/2013 | Phillips et al. |
| D687,376 S | 8/2013 | Farris-Gilbert et al. |
| D692,236 S | 10/2013 | Ashkenazy |
| D703,198 S | 4/2014 | Simmer |
| D703,722 S | 4/2014 | Kim et al. |
| D712,144 S | 9/2014 | Albanese |
| D713,145 S | 9/2014 | Fathollahi |
| D714,058 S | 9/2014 | Owen |
| D714,550 S | 10/2014 | Yoo |
| D715,052 S | 10/2014 | Fair |
| D716,045 S | 10/2014 | Requa |
| D716,049 S | 10/2014 | Fair |
| D719,950 S | 12/2014 | Smith et al. |
| D721,493 S | 1/2015 | Godshaw et al. |
| D724,833 S | 3/2015 | Schneider et al. |
| D724,834 S | 3/2015 | Schneider et al. |
| D726,246 S | 4/2015 | Shalon |
| D726,413 S | 4/2015 | Shalon |

(56) References Cited

U.S. PATENT DOCUMENTS

| | | | |
|---|---|---|---|
| D731,178 S | 6/2015 | Gorouvein et al. | |
| 9,069,189 B2 | 6/2015 | Shalon | |
| 9,081,209 B2 | 7/2015 | Shalon | |
| D740,018 S | 10/2015 | Zhang et al. | |
| 9,158,125 B2 | 10/2015 | Shalon | |
| 9,408,446 B2 | 8/2016 | Liebers et al. | |
| D765,975 S | 9/2016 | Hoofnagle et al. | |
| 9,581,830 B2 | 2/2017 | Porter | |
| 9,645,410 B2 | 5/2017 | Barnett et al. | |
| 9,696,756 B1 | 7/2017 | Olsson et al. | |
| 9,726,902 B2 | 8/2017 | Shalon | |
| D805,298 S | 12/2017 | Shalon | |
| D809,292 S | 2/2018 | Mason | |
| D810,431 S | 2/2018 | Kim et al. | |
| D822,996 S | 7/2018 | Ehara et al. | |
| D877,493 S | 3/2020 | Zhang | |
| D921,980 S | 6/2021 | Xu et al. | |
| 11,042,043 B1 | 6/2021 | Ginocchio | |
| D927,850 S | 8/2021 | May et al. | |
| D928,501 S | 8/2021 | McManigal et al. | |
| D930,898 S | 9/2021 | Choe | |
| D930,983 S | 9/2021 | Ryan | |
| D946,263 S | 3/2022 | Albay et al. | |
| D949,550 S | 4/2022 | Ramm et al. | |
| D952,343 S | 5/2022 | Liang | |
| D972,295 S | 12/2022 | Rasier et al. | |
| D972,299 S | 12/2022 | Zhou | |
| D972,300 S | 12/2022 | Zhou | |
| 11,538,189 B1 | 12/2022 | Sztuk et al. | |
| D984,283 S | 4/2023 | Dellamonica | |
| 2001/0028431 A1 | 10/2001 | Rossin | |
| 2001/0055093 A1 | 12/2001 | Saltoh et al. | |
| 2002/0096439 A1 | 7/2002 | Lin | |
| 2003/0025871 A1 | 2/2003 | Masunaga | |
| 2005/0078274 A1 | 4/2005 | Howell et al. | |
| 2005/0155872 A1* | 7/2005 | Cheng | A45C 11/04 206/6 |
| 2008/0083627 A1 | 4/2008 | Hamm | |
| 2008/0218683 A1 | 9/2008 | Lam et al. | |
| 2008/0231800 A1 | 9/2008 | Esser et al. | |
| 2009/0033862 A1 | 2/2009 | Margolis | |
| 2009/0051868 A1 | 2/2009 | Kwan | |
| 2009/0310080 A1 | 12/2009 | Dellapina | |
| 2010/0073625 A1 | 3/2010 | Engstrom | |
| 2010/0073626 A1 | 3/2010 | Engstrom | |
| 2010/0294675 A1 | 11/2010 | Mangano | |
| 2011/0205483 A1 | 8/2011 | Margolis | |
| 2011/0210018 A1 | 9/2011 | Friedman et al. | |
| 2011/0228210 A1 | 9/2011 | Willett | |
| 2012/0140163 A1 | 6/2012 | Hogan | |
| 2012/0218506 A1 | 8/2012 | Perez | |
| 2012/0293766 A1 | 11/2012 | Pitcairn | |
| 2012/0327360 A1 | 12/2012 | Lin | |
| 2014/0268005 A1 | 9/2014 | Pluta | |
| 2014/0317886 A1 | 10/2014 | Shwartz | |
| 2014/0360898 A1 | 12/2014 | Kantor et al. | |
| 2015/0061166 A1 | 3/2015 | Van De Vrie et al. | |
| 2016/0016370 A1 | 1/2016 | Sheldon et al. | |
| 2016/0018670 A1 | 1/2016 | Lando et al. | |
| 2016/0062139 A1* | 3/2016 | Shalon | G02C 5/08 351/64 |
| 2016/0077356 A1 | 3/2016 | Allen | |
| 2016/0077358 A1 | 3/2016 | Bischoff | |
| 2016/0116761 A1 | 4/2016 | Sbardella | |
| 2016/0320632 A1 | 11/2016 | Paulet Vazquez | |
| 2017/0255229 A1 | 9/2017 | Buckley | |
| 2017/0299885 A1 | 10/2017 | Shalon | |
| 2017/0322428 A1 | 11/2017 | Da Col | |
| 2018/0348541 A1* | 12/2018 | Radzwill | A45C 11/04 |
| 2019/0072780 A1 | 3/2019 | Balzan et al. | |
| 2020/0012122 A1 | 1/2020 | Johnson et al. | |
| 2020/0278563 A1 | 9/2020 | Shalon et al. | |
| 2020/0333628 A1 | 10/2020 | Ponte et al. | |
| 2023/0093500 A1 | 3/2023 | Ponte | |

FOREIGN PATENT DOCUMENTS

| | | |
|---|---|---|
| CN | 201600509 U | 10/2010 |
| CN | 202815334 U | 3/2013 |
| CN | 203365820 U | 12/2013 |
| CN | 204409884 U | 6/2015 |
| CN | 107290866 A | 10/2017 |
| CN | 206791908 U | 12/2017 |
| CN | 208243108 U | 12/2018 |
| CN | 110720726 A | 2/2020 |
| CN | 305784014 | 5/2020 |
| CN | 305863764 | 6/2020 |
| CN | 305969874 | 8/2020 |
| CN | 306887805 | 10/2021 |
| DE | 431225 C1 | 12/1993 |
| DE | 4407313 A1 | 9/1995 |
| DE | 102013007173 A1 | 10/2014 |
| EP | 1876488 A1 | 1/2008 |
| EP | 2016457 B1 | 6/2011 |
| GB | 328584 A | 4/1930 |
| IT | PD20110202 A1 | 12/2012 |
| IT | UD20110080 A1 | 12/2012 |
| JP | S51-16057 U | 2/1976 |
| JP | S58-175511 U | 11/1983 |
| JP | H01-64616 U | 4/1989 |
| JP | H04-26755 A | 1/1992 |
| JP | H08-146357 A | 6/1996 |
| JP | 2014213120 A | 11/2014 |
| KR | 2020130002469 U | 4/2013 |
| KR | 20140001657 U | 3/2014 |
| KR | 1020160046503 A | 4/2016 |
| WO | WO2006/114837 A1 | 11/2005 |
| WO | WO2010/086650 A1 | 8/2010 |
| WO | WO2011/068051 A1 | 4/2013 |
| WO | WO2014/133352 A1 | 9/2014 |
| WO | WO2020/157093 A1 | 8/2020 |

OTHER PUBLICATIONS

Google; Parasite eyewear; 3 pages; retrieved from the internet (https://www.google.com/search?q=parasite+eyewear&client=safari ved=0ahUKEwiipJC_4JPWAhXoyFQKHZ3HD-wQ_AUICy9C&biw=1416&bih=789) on Sep. 7, 2017.

Kickstarter; Roav—World's thinnest folding sunglasses; 14 pages; retrieved from the internet (https://www.kickstarter.com/projects/653457680/roav-anywhere-eyewear) on Jan. 8, 2019.

Pince-Nez; www.en.wikipedia.org/wiki/Pince-nez; pp. 1-4; printed Sep. 20, 2013.

Thinoptics; Glasses and Keychain case; 4 pages; retrieved from the internet (https://www.thinoptics.com/keychain-case-glasses) on Jan. 8, 2019.

VIMEO; FlashCard-Video; (Screenshot); 2 pages; retrieved from the internet (https://vimeo.com/266171301); on Apr. 23, 2018.

Wikipedia; Circular segment; 3 pages; retrieved from the internet (https://en.wikipedia.org/wiki/Circular_segment) on Jan. 8, 2019.

Ponte et al.; U.S. Appl. No. 29/743,439 entitled "Eyeglasses case," filed Jul. 21, 2020.

* cited by examiner

FOLDABLE EYEGLASSES AND CASE

CROSS REFERENCE TO RELATED APPLICATIONS

This application claims the benefit of U.S. Provisional Patent Application No. 62/663,156, filed Apr. 26, 2018, the entirety of which is incorporated by reference herein.

This application may be related to application Ser. No. 14/843,619, filed Sep. 2, 2015, now U.S. Pat. No. 9,726,902, which is a continuation-in-part of U.S. application Ser. No. 14/659,153, filed Mar. 16, 2015; which is a continuation of U.S. application Ser. No. 14/284,879, filed May 22, 2014, now U.S. Pat. No. 9,081,209; which is a continuation-in-part of U.S. application Ser. No. 13/899,606, filed May 22, 2013, now U.S. Pat. No. 9,069,189; which is a continuation of PCT/IB2011/055208, filed Nov. 21, 2011, which international application claimed priority to U.S. Provisional Application No. 61/344,930, filed Nov. 22, 2010. U.S. application Ser. No. 14/284,879, filed May 22, 2014, now U.S. Pat. No. 9,081,209, also claims the benefit under 35 U.S.C. § 119 of U.S. Provisional Application No. 61/826,127, filed May 22, 2013.

This application may also be related to U.S. Provisional Application No. 62/170,543, filed Jun. 3, 2015. The disclosures of all of these prior applications are incorporated herein by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

The present invention relates to eyewear and in particular to Pince-Nez eyeglasses (i.e., two lens eyewear lacking temple pieces) that are comfortable, stable and have universal fit while still having full sized optics. The eyeglasses of this invention are also thin, light and easily stored.

There are over 40 million people in the US that use reading glasses known as readers. Current readers typically purchased in a drug store or other mass merchandisers are designed to fit most people by using the nose as a resting place. Since nose width, angle and shape vary considerably among users, standard readers achieve their stability via the temple pieces placed above and behind the user's ears.

Users wear readers at a different place down their nose in order to allow them to look over the lenses of the readers and to change the distance from the lens to the eye to adjust their effective power. The temple pieces of standard readers are usually long enough to accommodate these different positions without loss of stability of the eyeglasses on the user's face.

Most Pince-Nez eyeglasses apply a significant clamping force on the nose in order to stabilize the lenses on the wearer's face. To provide a universal fit, Pince-Nez eyeglasses should accommodate noses of varying sizes and shapes at varying wearing locations while maintaining stability without user discomfort. Many Pince-Nez eyeglass designs fail to meet this standard, however. For example, while attaching Pince-Nez eyeglasses on the pliable tissues over the nostrils might help attach the eyeglasses to any size nose, most users would find this attachment location to be uncomfortable because it restricts breathing, and the glasses would be too far away from the eyes.

Another common problem with readers is their availability when needed. While the temple pieces of standard readers can be folded toward the lenses to reduce the storage size of the eyeglasses, the temple pieces take up storage space, and the overall volume of the storage configuration of the readers may limit their accessibility. Because Pince-Nez eyeglasses do not have temple pieces, they present new opportunities for storage and accessibility.

SUMMARY OF THE DISCLOSURE

The present invention relates to universal Pince-Nez eyeglasses for use as readers and/or as sunglasses. The invention also relates to eyeglasses systems including eyeglasses and storage cases for the eyeglasses.

Eyewear and in particular reading glasses and sun glasses that are used episodically benefit from a compact, convenient carrying case that attaches to key chains, smart phones, clothing or placed in pockets or purses. The present invention provides a convenient way to automatically fold the glasses into a carrying case not much bigger than the area of one lens, or the thickness of the two thin folded lenses.

Many eyewear lenses are susceptible to scratching when the lenses are repeatedly rubbed against another hard object such as a case or the opposite lens. The present invention addresses this problem for such lenses typically made from polycarbonate by protecting them in a fully enclosed case and avoiding the optical surfaces contacting another hard surface during the insertion and retrieval from the case.

Some eyewear such as sunglasses must be worn so the lenses cover the eyes in order to achieve the full benefit of such eyewear. In order to do so on highly varied nose widths among users, the Pince-Nez must bridge width must be continuously adjustable in order to accommodate each user while still allowing for it to fold the lenses over each other in order to be stored in the above mentioned case. Previous art, mostly antique Pince-Nez glasses, demonstrated folding fixed bridges and variable width spring loaded linear non-folding bridges. The present application describes a Pince-Nez bridge capable of both functions.

One aspect of the invention provides an eyewear system including eyeglasses having first and second lenses; first and second nose pads; and a bridge operably connecting the first and second lenses, the bridge being bendable from a bridge rest position to permit relative movement between the first and second nose pads and providing a bridge pinch force of 50 g or less between the nose pads when the nose pads are moved 7 mm or less from the bridge rest position. In some embodiments, the first and second nose pads are operably connected to the first and second lenses, respectively, via connectors adapted to permit relative movement between the first and second nose pads and the first and second lenses, respectively, and providing first and second pad forces resisting relative movement between the first and second nose pads and the first and second lenses from rest positions, the first and second pad forces being less than the bridge pinch force. Throughout the disclosure, for brevity, the term "g" or "grams" may be used for "gram-force," which is equal to 0.00980665 Newtons. The first and second nose pads may each have a cantilever extending from its respective connector. In some embodiments, the bridge force is a spring force having a spring constant greater than a spring constant of the cantilever of the first nose pad and the second nose pad.

In some embodiments, the nose pads are adapted to exert less than 150 g/cm² of pressure on a nose of a user when the eyeglasses are mounted on the nose. The nose pads may each include friction material, such as fine grit or a material having a friction coefficient less than 3.5.

Some embodiments of the eyewear system also include a case adapted to receive the eyeglasses, the case and eyeglasses being sized so that the bridge bends from its rest position when the eyeglasses are within the case. The bridge may be adapted to provide a retention force between the eyeglasses and the case when the eyeglasses are disposed within the case. In some embodiments, the case may also have offset frame guides sized and configured with respect to the eyeglasses to engage and fold the eyeglasses as the eyeglasses are inserted into the case.

In some embodiments, the case may also have a locking element adapted to hold the eyeglasses within the case. The case may also have an opening adapted to receive the eyeglasses, the locking element being disposed to block the opening in a first position and to permit access to the opening in a second position. The case may also have a rotatable connection adapted to permit the locking element to rotate between the first position and the second position.

In some embodiments, the case also has a keychain connector. The keychain connector may be disposed on the locking element.

In some embodiments, the bridge of the eyeglasses has an adjustable at-rest length. In some embodiments the bridge may be connected to the first and second lenses. The bridge may also include first and second adjustable connectors adapted to move with respect to the first and second lenses, respectively, to change an effective length of the bridge.

In some embodiments, the first and second nose pad connectors are connected to the first and second optical lenses, respectively. In some embodiments, the first and second nose pad connectors are adjustable to change a width between the first and second nose pads.

A first aspect of the invention provides an eyewear system including eyeglasses and a case, the eyeglasses having a first lens, a second lens, and a bendable bridge disposed between the first lens and second lens, the bendable bridge having a spring providing a spring force when the bridge is bent from a rest position, the eyeglasses being adapted to move from a wearable configuration in which the first and second lens do not overlap to a stored configuration in which the first and second lenses at least partially overlap, the bendable bridge being bent from its rest position in the stored configuration, the case having an opening through which the eyeglasses pass during insertion and guides sized and configured with respect to the eyeglasses to engage and fold the eyeglasses against spring force of the bridge to the stored configuration during insertion of the eyeglasses through the opening and into the case.

In some embodiments, the guides include a first guide having a first bearing surface adapted to engage a first side of the eyeglasses and a second guide having a second bearing surface adapted to engage a second side of the eyeglasses opposite to the first side during insertion of the eyeglasses into the case. The first bearing surface may be on a first side of the opening, and the second bearing surface may be on a second side of the opening opposite to the first side. In some embodiments, the first guide may further include a first tapered surface adapted to move the first lens toward a bottom portion of the case, and the second guide may further include a second tapered surface adapted to move the second lens toward a top portion of the case during insertion of the eyeglasses into the case. In some embodiments, the guides are offset from each other.

In some embodiments, the case further includes a clasp with an engagement surface sized and shaped to engage the bendable bridge of the eyeglasses and an actuator adapted to move the clasp from a first position near the opening in the case to a second position within the case away from the opening, wherein movement of the clasp from the first position to the second position while the clasp is engaged with the bendable bridge of the eyeglasses is operative to move the eyeglasses into the stored configuration. The actuator may include, e.g., a button on an outside surface of the case and movable within a slot within the case. Some embodiments also have an optional first stop element positioned to hold the clasp in the first position and an optional second stop element positioned to hold the clasp in the second position.

In some embodiments, the clasp further includes a retention portion shaped to retain the bendable bridge of the eyeglasses within the case. The clasp may also have an opening and a bendable portion adapted to bend the retention portion from a first position in which the opening permits insertion of the bendable bridge and a second position in which the retention portion retains the bendable bridge. In some embodiments, the retention portion moves from its first position to its second position as the clasp moves from its first position to its second position.

In some embodiments, the case further includes a first internal surface adapted to engage a first side of the eyeglasses associated with the first lens in the stored configuration and a second internal surface adapted to engage a second side of the eyeglasses associated with the second lens in the stored configuration, the spring force of the bridge spring providing a retention force between the eyeglasses and the case.

In some embodiments, the eyeglasses also have a bridge carrier disposed between the bridge and the first lens providing an adjustable effective length of the bendable bridge with respect to the first and second lenses. The eyeglasses may also have a second bridge carrier disposed between the bendable bridge and the second lens and operable with the first bridge carrier to adjust the effective length of the bendable bridge with respect to the first and second lenses.

Another aspect of the invention provides a method of storing eyeglasses in a case, the eyeglasses having a first lens, a second lens, and a bendable bridge disposed between the first lens and second lens, the bendable bridge having a spring providing a spring force when the bridge is bent from a rest position. In some embodiments, the method includes the following steps: moving the eyeglasses through an opening into the case; and engaging first and second sides of the eyeglasses with first and second guides during the moving step to bend the bendable bridge against its spring force to fold the eyeglasses into a stored configuration in which the first and second lenses at least partially overlap within the case.

Some embodiments include the step of moving the first lens toward a top portion of the case and moving the bottom lens toward a bottom portion of the case.

Some embodiments of the method include the step of engaging the bendable bridge with a movable clasp in the case. The method may also include the step of moving the clasp away from the opening after engaging the bendable bridge such as by, e.g., sliding an actuator. The method may also include the step of engaging the clasp with a stop element to hold it in position.

In some embodiments, the step of engaging the bendable bridge with a movable clasp includes the step of inserting the bendable bridge through an opening in the movable clasp, the method further comprising closing the clasp opening to retain the bendable bridge in the clasp.

Another aspect of the invention provides Pince-Nez eyeglasses having a first lens, a second lens, a bendable bridge comprising Nitinol wire disposed between the first second lenses, and first and second disposed between the first and second lenses, the bendable bridge and the nose pads cooperating to support the Pince-Nez eyeglasses on a user's face without temple pieces. In some embodiments, the Pince-Nez eyeglasses also include a frame at least partially surround the first lens and the second lens. In some such embodiments, the nose pads and/or the bendable bridge may extend from the frame.

In some embodiments, the first lens and the second lens each are made at least partially from polycarbonate. In some embodiments, the first lens and the second lens are each a full size lens. In some embodiments, the nose pads each have a thickness no larger than a thickness of the first lens or the second lens, and in other embodiments, the nose pads each have a thickness greater than a thickness of the first lens and a thickness of the second lens. In some embodiments, the nose pads each comprise a friction material.

Another aspect of the invention provides an eyewear system comprising eyeglasses and a case. The eyeglasses comprise a first lens, a second lens, and a bendable bridge disposed between the first lens and second lens, the bendable bridge comprising a spring providing a spring force when the bridge is bent from a rest position. The eyeglass are adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration. The case comprises a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case comprises a thickness of less than about 5 mm and a length of less than about 90 mm.

The guides can comprise a first guide having a first bearing surface adapted to engage a first side of the eyeglasses and a second guide having a second bearing surface adapted to engage a second side of the eyeglasses opposite to the first side during insertion of the eyeglasses into the case and closing the door. In some embodiments, the first bearing surface is on a side of the opposing the opening. In some embodiments, the second bearing surface comprises an inner surface of the door. The second bearing surface can comprise an inner surface of the case adjacent the door. In some embodiments, the system comprises a third guide comprising a curved surface configured to engage the bridge and guide the eyeglasses to their storage position upon insertion of the eyeglasses into the case. The case can comprise one or more openings around a perimeter of the case through which the eyeglasses protrude while in a stored configuration while still remaining within an external footprint of the case. In some embodiments, the case comprises four openings around the perimeter of the case through which the eyeglasses protrude while in a stored configuration while still remaining within an external footprint of the case. In some embodiments, a width of the case is less than about 55 mm. The case can comprise an internal storage area for receiving the eyeglasses. The volume of the internal storage area can be less than about 9 ml. The case can have a generally rectangular shape. In some embodiments, the door comprises a hook feature configure to interact with a notch feature of the case.

In another aspect, a method of storing eyeglasses in a case is provided. The eyeglasses comprise a first lens, a second lens, and a bendable bridge disposed between the first lens and second lens, the bendable bridge comprising a spring providing a spring force when the bridge is bent from a rest position. The method comprises inserting the eyeglasses through an opening into the case such that the first lens is inserted first; moving the eyeglasses far enough inside the case for an engaging surface of a door of the case to engage an outside edge of the second lens; and closing the door, thereby engaging first and second sides of the eyeglasses with first and second guides during the moving step to bend the bendable bridge against its spring force to fold the eyeglasses into a stored configuration in which the first and second lenses rotate toward another about a midpoint of the bendable bridge while remaining in a same plane.

In some embodiments, the method comprises engaging the bridge with a curved guide inside the case during insertion of the eyeglasses. The method can comprise opening the door, thereby causing the eyeglasses to pop out of the case. Opening the door can comprise grasping a button on the door. The case can comprise a thickness of less than about 5 mm. In some embodiments, the case comprises a length of less than about 90 mm. Closing the door can comprise extending portions of the eyeglasses through apertures around a perimeter of the case.

In another aspect, an eyewear system comprising eyeglasses and a case is provided. The eyeglasses comprise a first lens, a second lens, and a bendable bridge disposed between the first lens and second lens, the bendable bridge comprising a spring providing a spring force when the bridge is bent from a rest position, the eyeglasses being adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration, the case comprising a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case comprises a thickness of less than twice the thickness of the glasses and a length of less than the length of the glasses.

In some embodiments, the length of the case is less than or equal to about 100 mm. In some embodiments, the length of the case is less than or equal to about 95 mm. The length of the case can be less than or equal to about 90 mm. The length of the case can be less than or equal to about 80 mm. In some embodiments, the length of the case is about 70-100 mm. In some embodiments, the thickness of the case is less than about 5 mm. The thickness of the case can be less than about 4.8 mm. The thickness of the case can be about 4.5 mm. In some embodiments, a width of the case if about 40-60 mm. The width of the case can be substantially greater than the width of the eyeglasses in the rest position. In some embodiments, the width of the case is greater than about 40 mm. The width of the glasses can be greater than about 50 mm. In some embodiments, the width of the case is about 50-60 mm.

In yet another aspect, an eyewear system comprising eyeglasses and a case is provided. The eyeglasses comprise a first lens, a second lens, and a bendable bridge disposed between the first lens and second lens, the bendable bridge comprising a spring providing a spring force when the bridge is bent from a rest position, the eyeglasses being adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration, the case comprising a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case is configured to store the eyeglasses in their stored configuration such that the first and second lens are not overlapping and such that a length of the eyeglasses is reduced in the stored configuration.

In some embodiments, the case is sized to fit within a wallet. The case can be sized to fit within a standard pocket.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
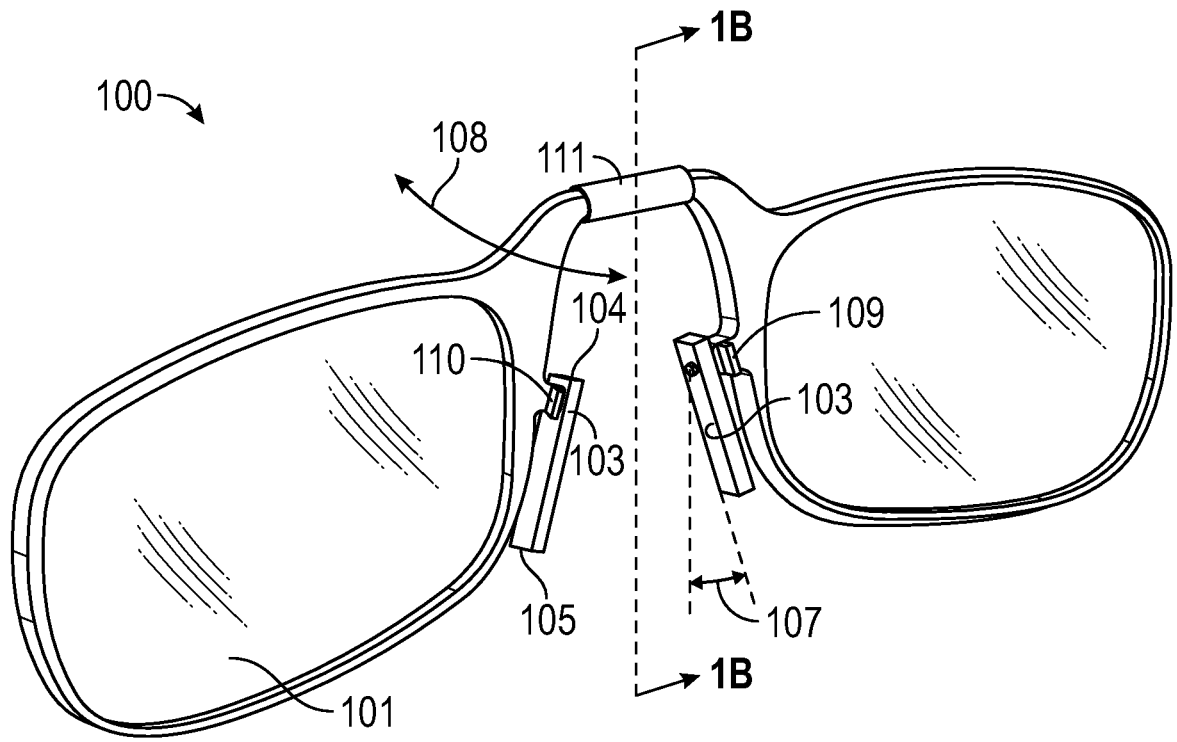
FIG. 1A is a perspective view of Pince-Nez eyeglasses according to one embodiment of the invention.

Prior art Pince-Nez eyewear (see wwwdotendotwikipediadotorg/wiki/Pince-nez) typically utilize nose pads that are directly or indirectly attached to the lenses or lens frame. As a result, any changes to the distance between nose pads affect the distance between the lenses and their angular orientation and position with respect to the eyes, which can induce optical prism, introduce error in the optical cylinder axis or affect the lens aesthetics. The varying distance between the nose pads of prior art Pince-Nez eyewear further changes the nose clamp spring force, resulting in an inconsistent pinch force for different users, an unstable fit for some and discomfort for others. The large pinch force can also lead to tissue ischemia, adding to user discomfort.

The present invention provides eyeglasses that are comfortable and stable on noses of nearly all sizes and shapes. Typical reading glasses weigh over 20 g, even foldable compact versions (e.g., MicroVision) with smaller lenses weigh over 14 g. It will be appreciated that in a Pince-Nez design, the weight of the eyewear is important for both stability on the nose and comfort. Heavier eyewear without ear pieces requires more clamping force to maintain stability on the nose because of the increased weight and the increased mechanical moment which causes instability when the user moves their head up and down or from side to side. Since the clamping force translates to pressure exerted by the nose pads on the tissue, a larger clamping force can lead to user discomfort, pain and in extreme cases, tissue ischemia. Thus, in some embodiments, the eyeglasses reduce the pinching pressure required to maintain a stable position by reducing the mass of the full size optics and hence reducing inertia caused by head movement and gravitational pull and increase the area of the thin nose pads to distribute the force and hence reduce the pressure further.

In addition, some embodiments of the eyewear of this invention optionally increase the friction between the eyewear and the nose skin by utilizing novel nose pad materials. Such eyewear further reduces the clamping force required for stability while reducing the force causing slippage off the nose.

Some embodiments of the Pince-Nez eyewear of this invention provide the nose pinch force with a super elastic bridge spring whose force does not change significantly as a function of nose width. For example, the eyewear may employ thin super elastic alloy wire made from Nitinol to interconnect the lenses (referred to herein as a lens bridge). A superelastic bridge allows repeated transformation from a worn position to a folded position for storage while exerting repeatable, controlled and nearly constant low pinch force for varying bridge deformation cause by varying width noses during wear. This feature combined with use of thin molded polycarbonate lenses results in Pince-Nez reading eyewear a large viewing zone for reading comfortably without lens distortion and without the usability compromises often inflicted by compact reading glasses.

Some embodiments of the Pince-Nez eyewear of this invention provide elongated thin nose pads or folding nose pads whose specific separation distance allows the top of the pad to engage the nose via the force created by bridge spring while the bottom of the nose pad can flex or pivot to accommodate different nose angles and thus prevent the glasses from tipping forward.

One embodiment of the eyeglasses of this invention is shown in FIG. 1. The eyeglasses 100 include full sized lenses 101 over molded on a nitinol wire bridge 102 (NDC, Fremont CA) with diameter of 0.010" to 0.030" (e.g., 0.020") covered with an elastomer 111. The lenses may be clear optical lenses for reading glasses or tinted sunglass lenses.

Figure 1B:
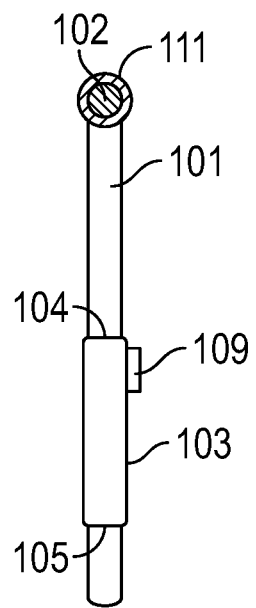
FIG. 1B is a cross-sectional view taken along the line B-B shown in FIG. 1A.

In the embodiment shown in FIGS. 1A and 1B, the lenses 101 are molded polycarbonate optical lenses less than 3 mm thick weighing less than 5 grams for 2.5 diopter full sized reading glasses with lens optical area of over 9 cm$^2$. For lower optical powers or smaller optical area, the lens thickness and reader's weight can be reduced even further. For sunglasses or 3D glasses with no optical power the lenses can be less than 2 mm thick for any optical zone.

The lenses 101 are attached to the super elastic bridge 102, as shown. In alternative embodiments, the lenses can be attached to a frame, with the bridge forming part of the frame or extending between two frame sections.

In the illustrated embodiment, the eyeglasses have nose pads 103 that are no wider than the lens thickness. In this embodiment, the nose pads 103 are 13 mm long (+/−4 mm). Nose pads 103 are attached to the lenses 101 (or, if there is an optional frame, to the frame) at their upper ends 104 and are free at their lower ends 105 to form cantilevers extending downward. In one embodiment, there is a 12 mm (+/−3 mm) separation between the tops 104 of the nose pads 103, and the nose pads 103 extend downward at an angle 107 of 18°+/−4° from the vertical in their rest positions.

In some embodiments, the nose pads are formed from a flexible material, such as 0.005-0.020" (e.g., 0.010") inch thick polycarbonate. In such embodiments, the nose pad material, shape and cantilever connection permit the nose pads 103 to bend with a spring constant that is less than the spring constant of the bridge 102. The nose pads 103 can therefore flex to accommodate the nose geometry while permitting the entire nose pad to maintain contact with the nose.

In some embodiments, a 10 mm long super elastic bridge 102 exerts a pinch force measured at the tops 104 of the nose pads 103 of less than 10 g on a narrow nose width of 12 mm, and less than 50 g (0.05 N) on a large nose width of 19 mm (all measurements+/−20%), as it flexes through angle 108 to accommodate various width noses. The 13.5 mm long nose pads 103 are 2 mm wide providing a total area of 0.24 cm$^2$ and thus average pressure well less than 150 g/cm$^2$.

The nose pads 103 may have an optional friction material (e.g., laminated onto an elastic member, such as the polycarbonate described above) to further increase the stability of the eyeglasses on the nose by minimizing slippage force due to the component of the pinch force along the surface of the skin and rotation moment due to the eyeglasses' center of mass. The friction can be created by low durometer elastomers such as 3M grip tape (GM613, 3M MN, ASTM 1894 coefficient of friction measured against the same material of less than 3.5), silicone, open cell polyurethane, or micro texture sufficient to grip the skin but not to cause discomfort such as textured polymer (polycarbonate embossed with micro machined or micro molded texture) or micro grit impregnated surface (60-400 grit).

Figure 2:
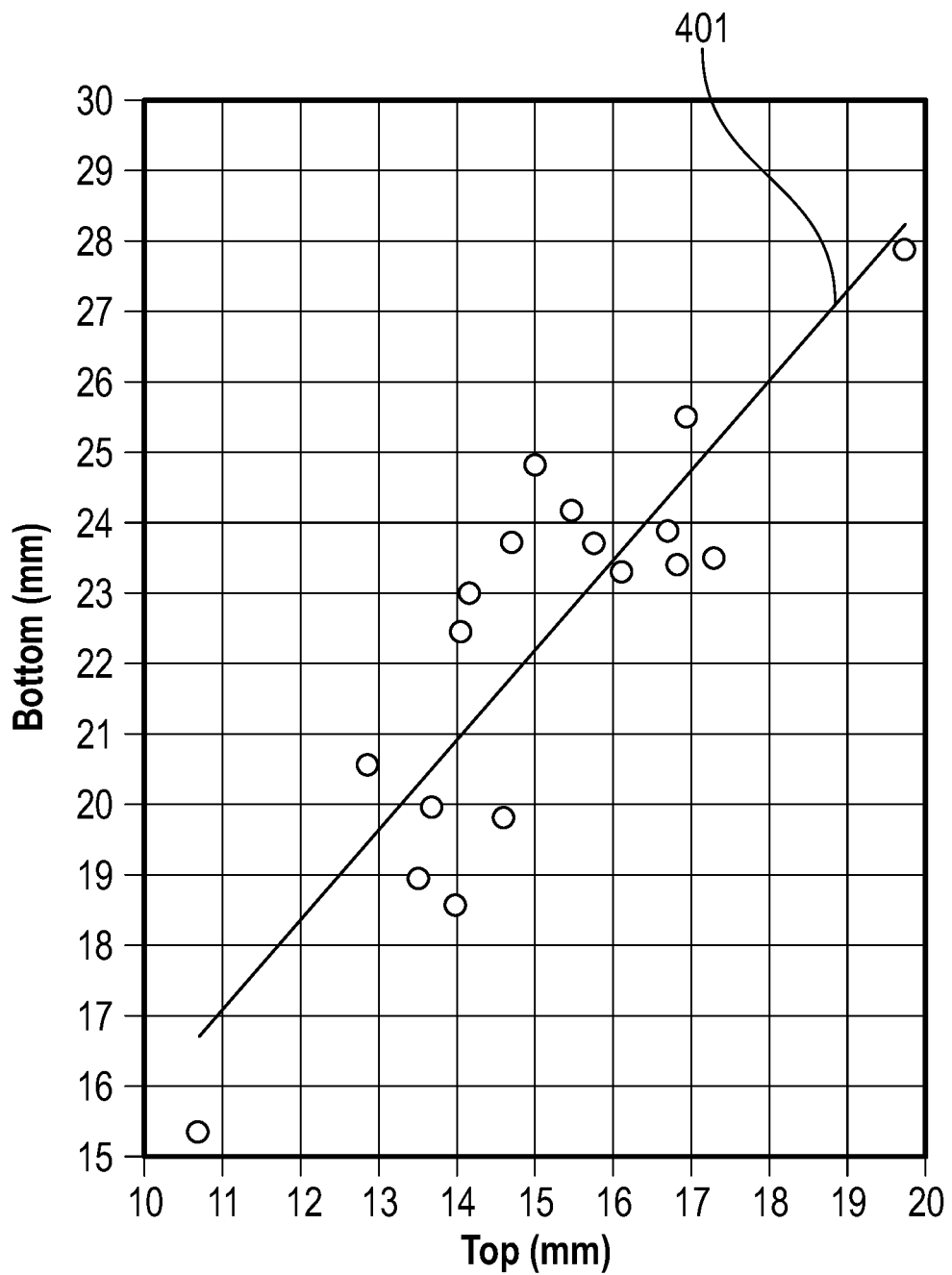
FIG. 2 plots the distance between the tops of the nose pads versus the distance between the bottoms of the nose pads for a variety of users wearing the eyeglasses of FIGS. 1A and 1B.
Figure 3:
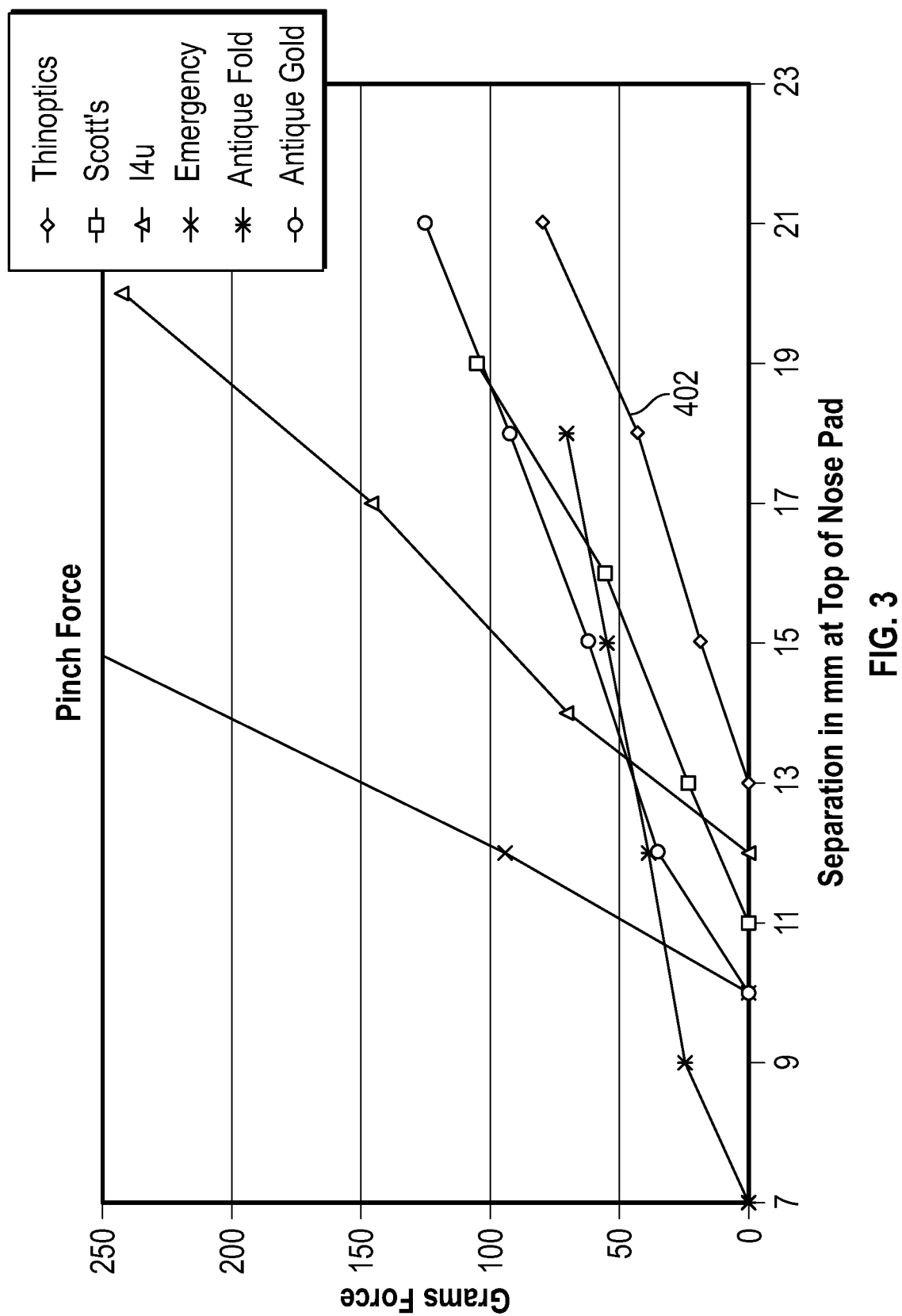
FIG. 3 compares the nose pinch force provided by a variety of Pince-Nez eyeglasses.

Test data comparing various Pince-Nez eyeglass designs are shown in FIGS. 2 and 3. FIG. 2 plots the distance (as determined by optical measurements) between the tops 104 of the nose pad 103 versus the distance between the bottoms 105 of the nose pads 103 for a variety of users (having a variety of nose sizes and shapes) each wearing the eyeglasses embodiment shown in FIGS. 1A and 1B. The average top distance was 16.1 mm (STD 2.4 mm) with a range of 10.6-19.8 mm and a bottom distance of 23.9 mm (STD 3.1) with a range of 15.4-27.9 mm. As can be appreciated from the linear regression line 401, no one line can be drawn so that all the users would experience proper fit. These measurements were made with the test frame positioned on the appropriate location on the nose bridge; in practice, users vary the location of the eyeglasses on their nose based on the task which adds further variability to the data. As observed in many fit studies, if the bottoms of the nose pads contact the nose while the top pads do not due to the angle and separation, the bottom contact point becomes a pivot point and the glasses easily tip over and fall off the face when the user tilts their head downward to read a tablet or menu. If the top of the nose pads contacts the nose, it becomes the pivot point and the glasses tip over making them no longer perpendicular to the visual axis compromising their usefulness.

FIG. 3 compares the nose pinch force (measured at the top of the nosepads) provided by a variety of Pince-Nez eyeglasses. The embodiment shown by FIGS. 1A and 1B is represented by line 402. As can be seen, the eyeglasses of this invention provide lower pinch forces than the other eyeglasses tested across a range of nose sizes.

Figure 4:
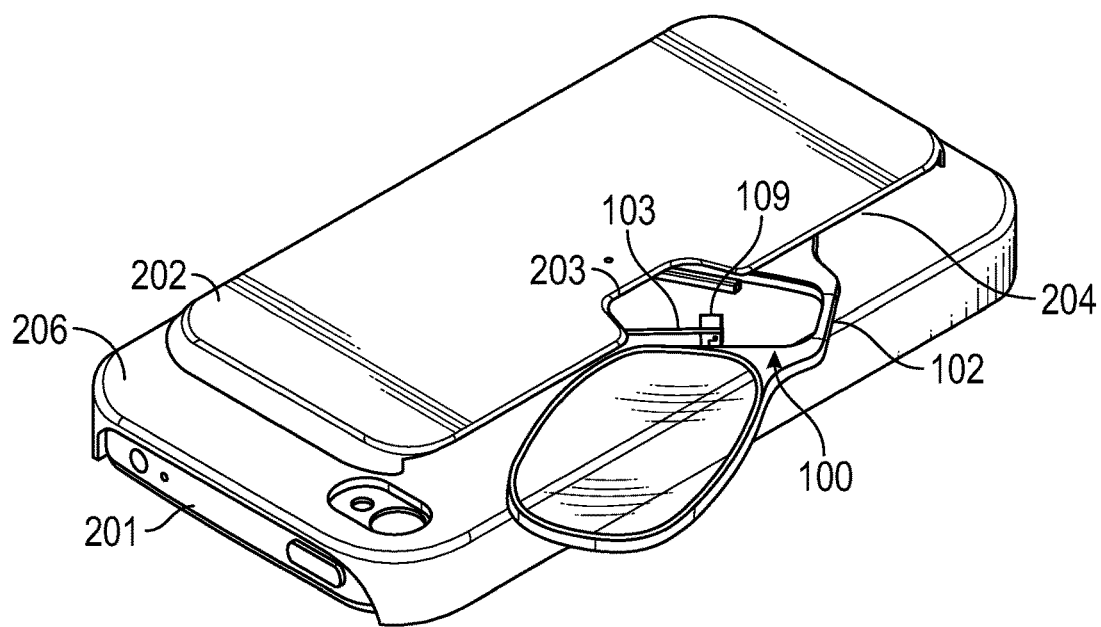
FIG. 4 is a perspective view of an embodiment of eyeglasses and case according to another embodiment of the invention in which the eyeglasses are stored flat.
Figure 8:
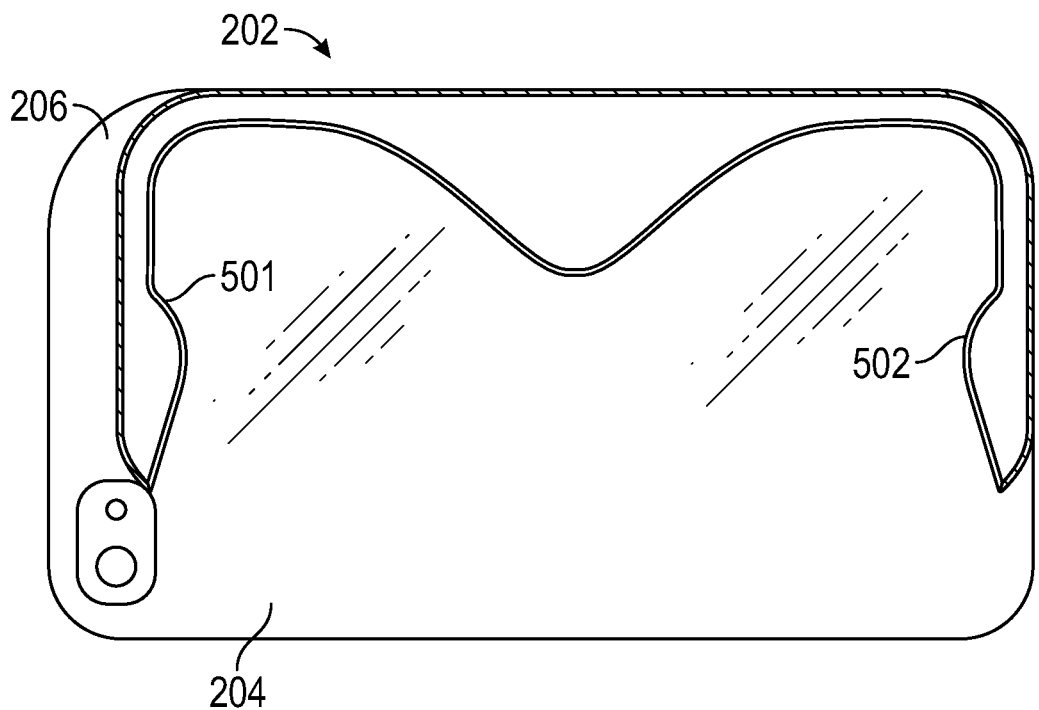
FIG. 8 is sectional view of the case of FIG. 4 without the eyeglasses.

In some embodiments, the eyeglasses are designed to fit in compact storage cases, as discussed in more detail below. For example, the embodiment shown in FIGS. 1A and 1B may be stored flat in a case 202 extending from a housing 206 designed to be attached to the back of a cell phone 201, as shown in FIG. 4. Case 202 has an opening 204 at its top into which the eyeglasses 100 may be inserted. In some embodiments, the eyeglasses 100 are slightly longer than the case 202, and the eyeglasses are therefore bent at the bridge 102 during insertion. In such embodiments, the spring action of the bridge 102 may help retain the eyeglasses in the case. Optional retention features, such as surfaces 501 and 502, may be provided inside the case to hold the eyeglasses within the case, as shown in the cut-away view of FIG. 8. In this optional embodiment, the eyeglasses bend at bridge 102 as they are inserted through opening 204 into case 202, then unbend slightly as the lenses pass surfaces 501 and 502. Likewise, to remove the eyeglasses from case 202, the eyeglasses bend at bridge 102 when the lenses move toward each other as the eyeglasses are pulled through opening 204.

An optional cut-away portion 203 may leave the bridge 102 exposed after insertion so that the eyeglasses may be easily extracted from the case. In some embodiments, protruding portions of the eyeglasses (such as, e.g., features 109 and 110 shown in FIGS. 1A and 1B) may provide a friction fit between the eyeglasses 100 and the inside of case 202. In some embodiments an internal storage volume of the case 202 is less than 14 cm$^3$ for a full 40 mm wide optical zone 2.5 diopter readers stored flat as shown in FIG. 4, and the case 202 is less than 4 mm thick.

Figure 5:
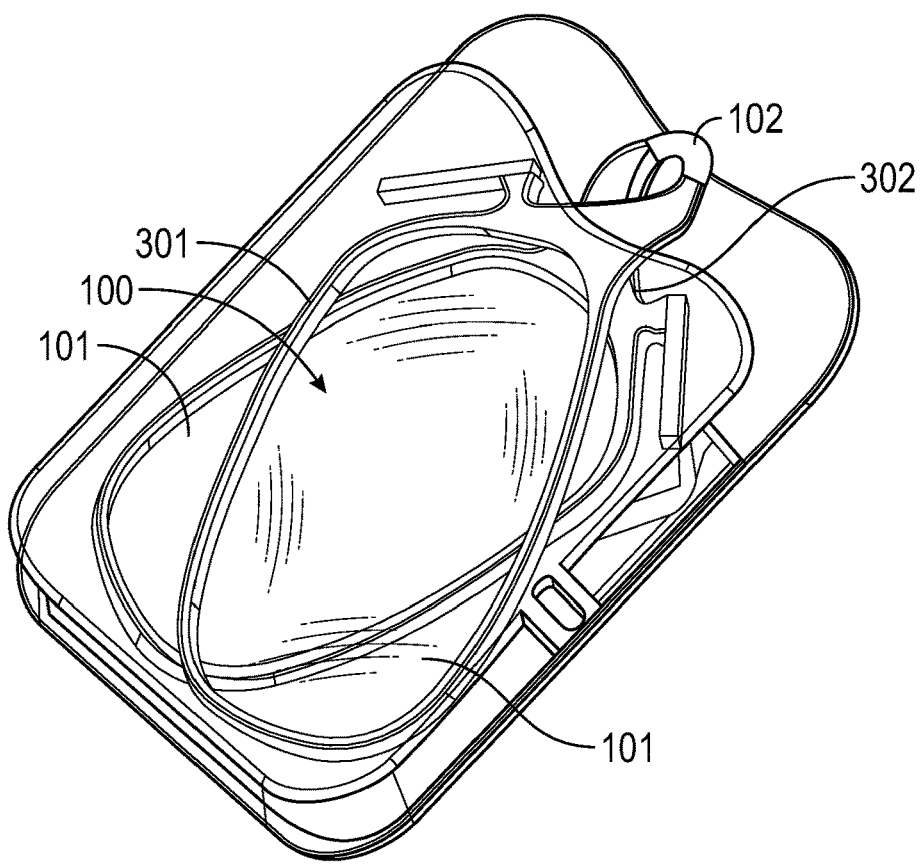
FIG. 5 is an elevational view of an embodiment of eyeglasses and case according to another embodiment of the invention in which the eyeglasses are stored in a folded configuration.
Figure 6:
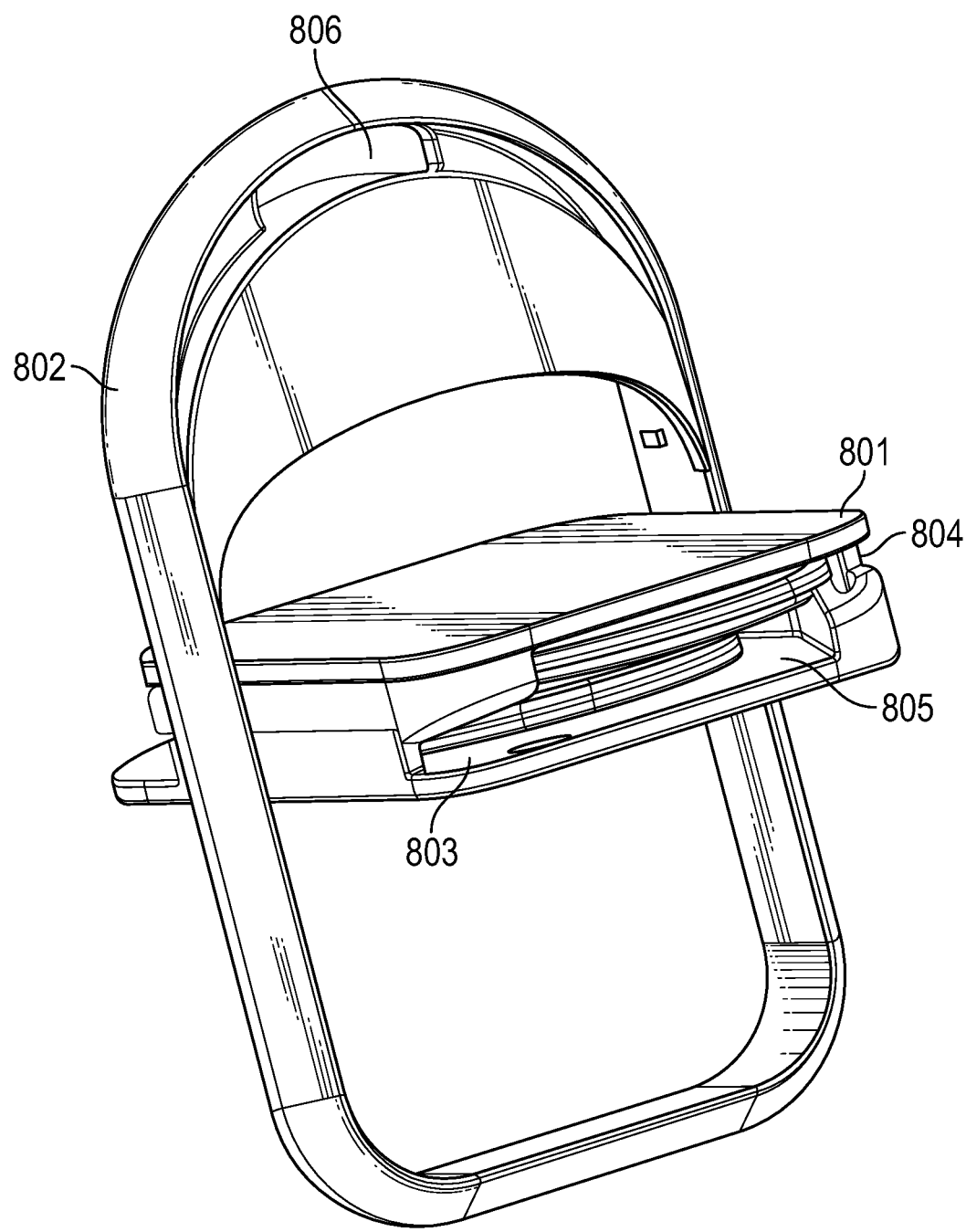
FIG. 6 is a perspective view of an embodiment of eyeglasses and case according to yet another embodiment of the invention in which the eyeglasses are stored in a folded configuration.
Figure 7:
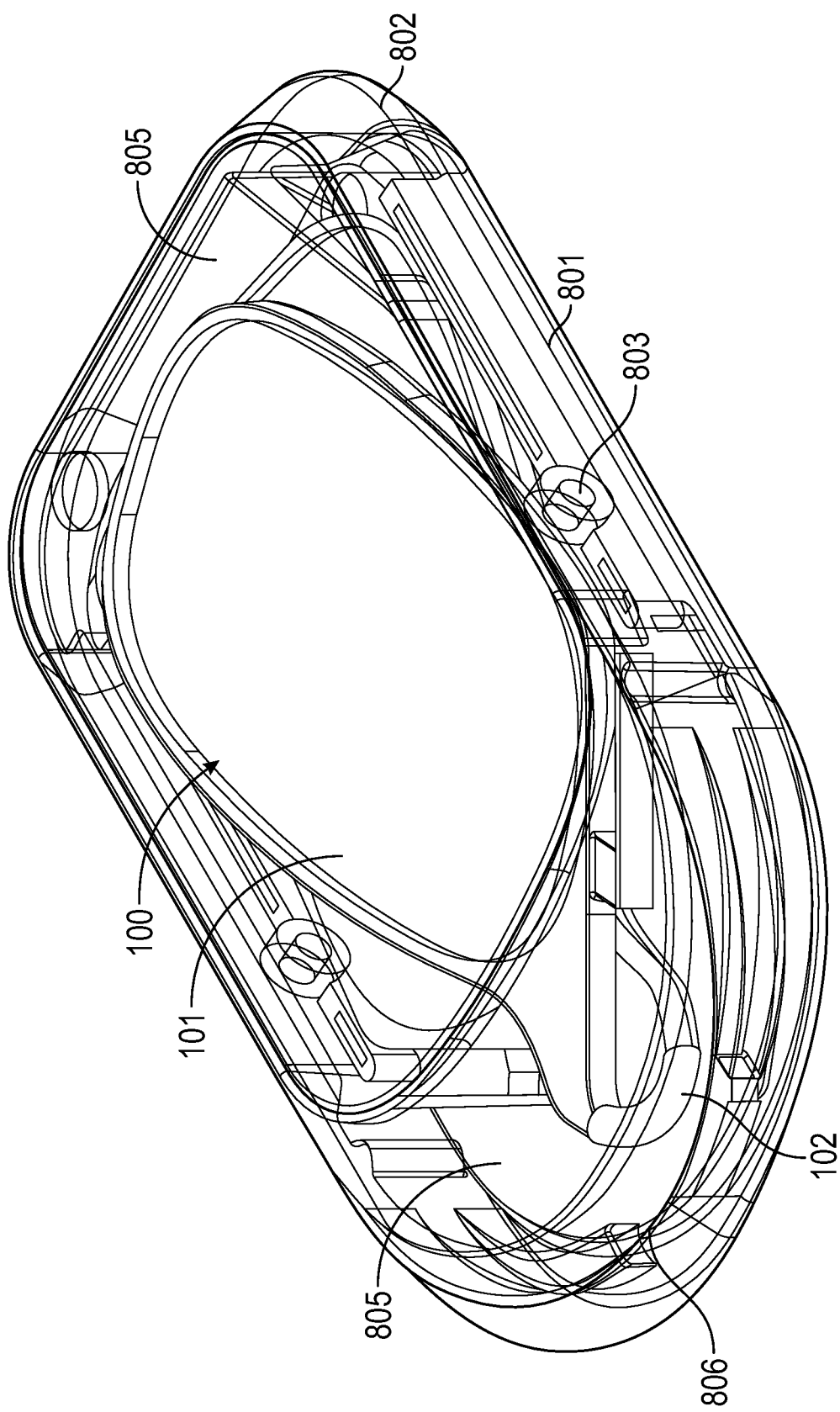
FIG. 7 is a perspective view of the embodiment of FIG. 6 with the locking band in a locked position.

FIGS. 5-7 show embodiments of Pince-Nez eyeglass cases in which the eyeglasses are folded for storage. In FIG. 5, the eyeglasses 100 are bent at the bridge 102 to place one lens 101 over the other lens 101. Eyeglasses 100 may be inserted through an opening 302 on one end of the case 301. The spring force of the superelastic bridge 102 and the friction fit between the eyeglasses and the interior of the case 301 maintain the position of eyeglasses 100 within case 301. Bridge 102 extends through opening 302 as shown to provide structure to grab for removal of eyeglasses 100 from case 301. In this embodiment, the case 301 may be only 9 mm thick or less.

In the embodiments of FIGS. 6 and 7, eyeglasses 100 may be inserted through an opening 804 for storage within an eyeglass case 801. A locking band 802 rotates around pivot 803 to open the case 801 (as shown in FIG. 6) or close it (as shown in FIG. 7). Bridge 102 may be inserted first, as shown, and a pair of optional offset guides 803 and 804 help move the one lens 101 over the other lens 101 as the eyeglasses are advanced into case 801. An optional keychain hook 806 may be provided for attachment of the case to a keychain or other holder. The expanding force of superelastic bridge 102 causes the eyeglasses to move against the internal surfaces of the case and helps retain the eyeglasses in the case.

Figure 9:
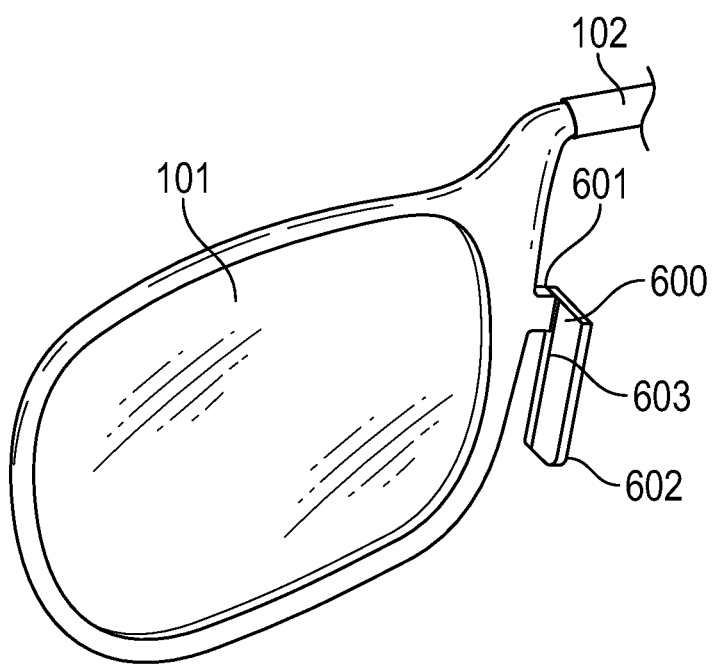
FIG. 9 is a partial perspective view of yet another embodiment of the eyeglasses of this invention.

An alternative embodiment of the eyeglasses is shown in FIG. 9. In this embodiment, the nose pads 600 are wider than the thickness of the lens 101. The nose pads therefore are designed to fold for storage. For eyeglasses intended to be stored flat, the nose pads must fold to a thickness equal to or less than the thickness of the lenses. For eyeglasses intended to be stored in a folded configuration, the nose pads must fold to a thickness equal to or less than the combined thicknesses of the two lenses.

For example, as shown in FIG. 9, the nose pad 600 is formed from a laminate 602 made from friction enhancing material and polycarbonate (0.01" thick) and is attached to the bridge 601 at the top point. Nose pad 600 offers the same spring action described above (i.e., it has a spring constant less than the spring constant of bridge 102) but distributes the pinch force over a larger area. When stored, the nose pad folds along line 603 to become flat.

Figure 10:
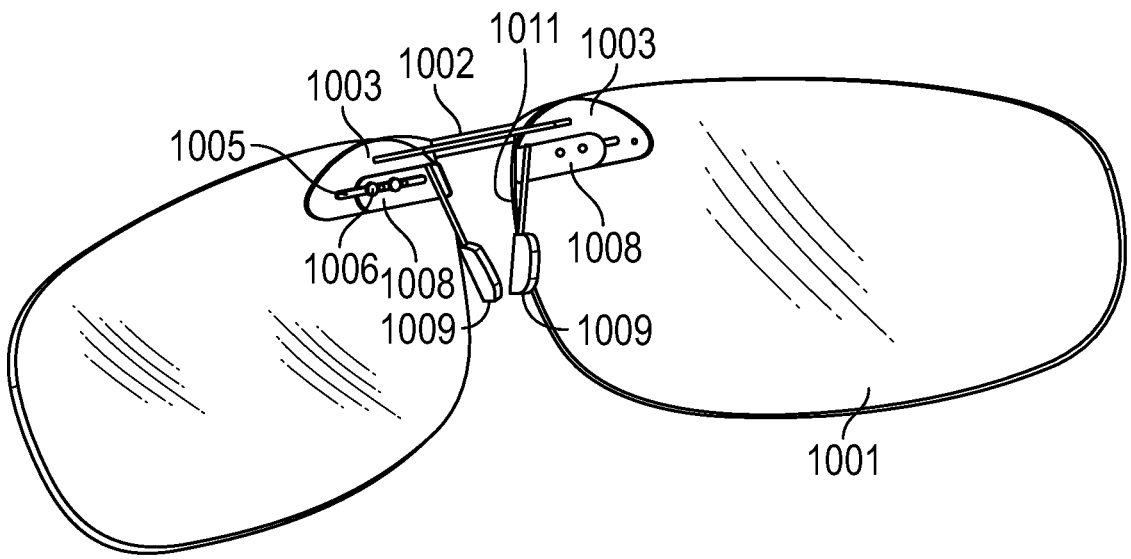
FIG. 10 is a perspective view of another embodiment of the eyeglasses of this invention.

Yet another configuration is shown in FIG. 10. Eyeglasses 1000 have lenses 1001 connected by a superelastic bridge 1002. Nose pads 1009 with friction material facing the nose are connected to the lenses 1001 by nose pad carriers 1008 and super elastic torsion members such as nitinol wires 1011 (0.02" diameter or less) and fold into the plane of the lenses when the lenses are inserted into a case or are folded flat against each other. The torsion element provides the spring force to engage the nose with the pad as well as torsion force to restore this orientation when withdrawn from a case thus making the glasses ultra compact and easy to store and carry.

The embodiment shown in FIG. 10 may be full size sunglasses having a 62 mm wide optical zone and weighing less than 7 g. The sunglasses may be stored in a flat configuration or in a folded configuration, as described above, in a case with an internal volume less than 10 cm$^3$.

The embodiment of FIG. 10 also provides adjustable positions for the bridge 1002 and nose pads 1009 to accommodate a range of nose sizes for a comfortable and secure fit. Superelastic nitinol bridge 1002 is attached to two thin bridge carriers 1003 that can slide on the back surface of the lenses. Plastic or metal rivets 1006 whose heads are trapped by holes on the front of each lens penetrate serrated channels 1005 in the carriers 1003. The rivets are attached to the nose pad carriers 1008 so that as the lenses are pushed toward each other the nose bridge narrows to accommodate narrower noses.

Figure 11:
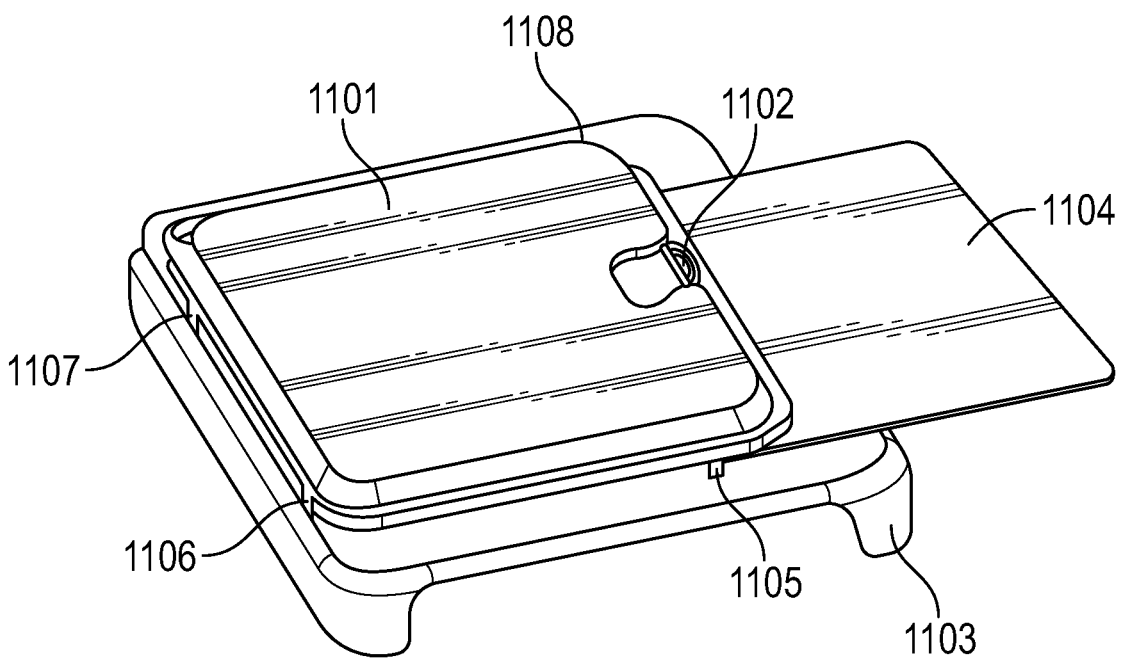
FIG. 11 is a perspective view of yet another case for use with eyeglasses according to this invention.

FIG. 11 shows yet another embodiment of a flat glasses case 1101 attached to a housing 1103 via elastic connections 1105, 1106, 1107, and 1108. Housing 103 may be designed to attach to a cell phone. Elastic connections 1105-1108 permit the distance between case 1101 and housing 1103 to be increased to allow the user to use the space between the glasses case 1101 and the housing 1103 as a compact wallet carrying money, ID or credit cards 1104.

FIGS. 12-20 illustrate an eyewear system including bendable eyeglasses and a case for the holding the eyeglasses according to another aspect of the invention. Case 1200 has a top portion 1202 and a bottom portion 1204. An optional opening 1206 through the top and bottom portions of the case provides a way to hang the case from, e.g., a keyring. An actuator 1208 extends through, and is movable along, a groove 1210 in the top portion 1202 of case 1200 and is operably connected to a clasp 1212 in the interior of case 1200. An opening 1214 in one end of the case is sized and configured to receive eyeglasses 1216 for storing in the interior of case 1200. Eyeglasses 1216 are substantially as described above and include a first lens 1218, a second lens 1220 and a bendable bridge 1222. The eyeglasses may also have nose pieces 1219 as described above.

Figure 12:
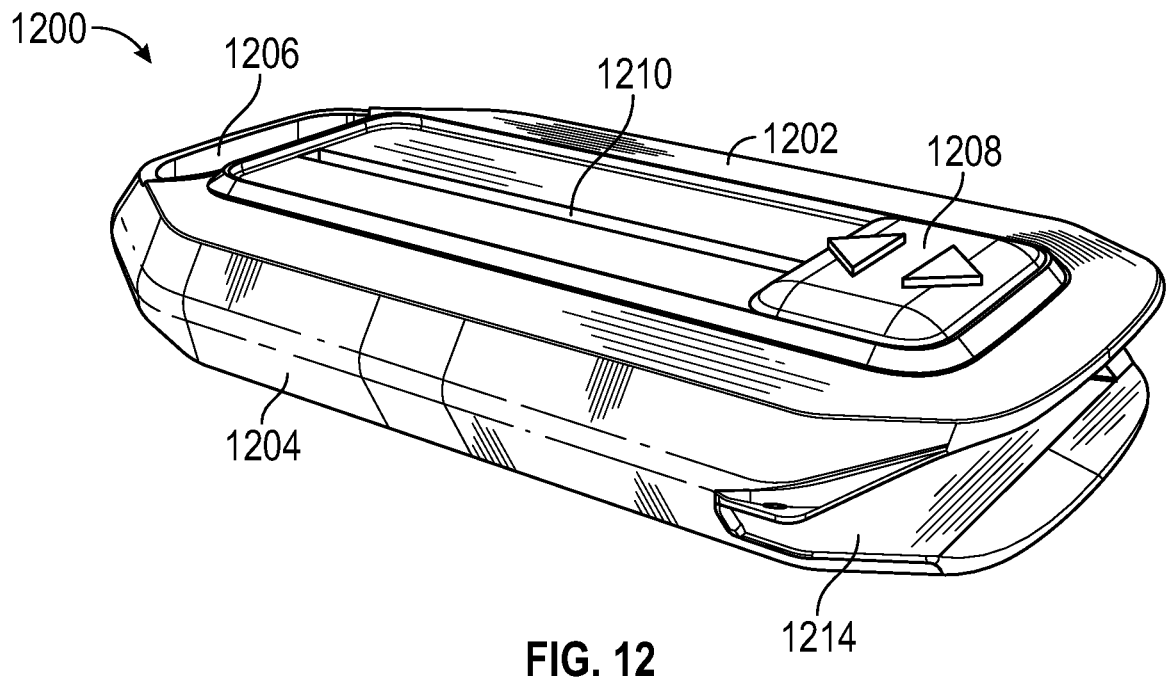
FIG. 12 is a perspective view of an eyeglasses case according to another aspect of this invention.
Figure 13:
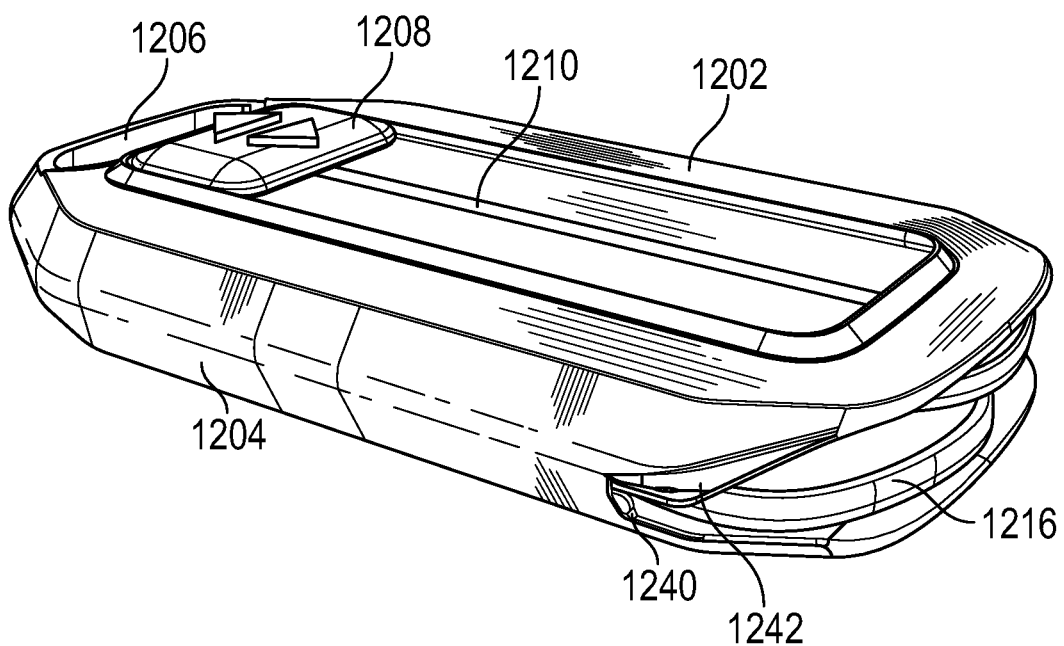
FIG. 13 is a perspective view of the eyeglasses case of FIG. 12 storing eyeglasses of this invention.
Figure 14:
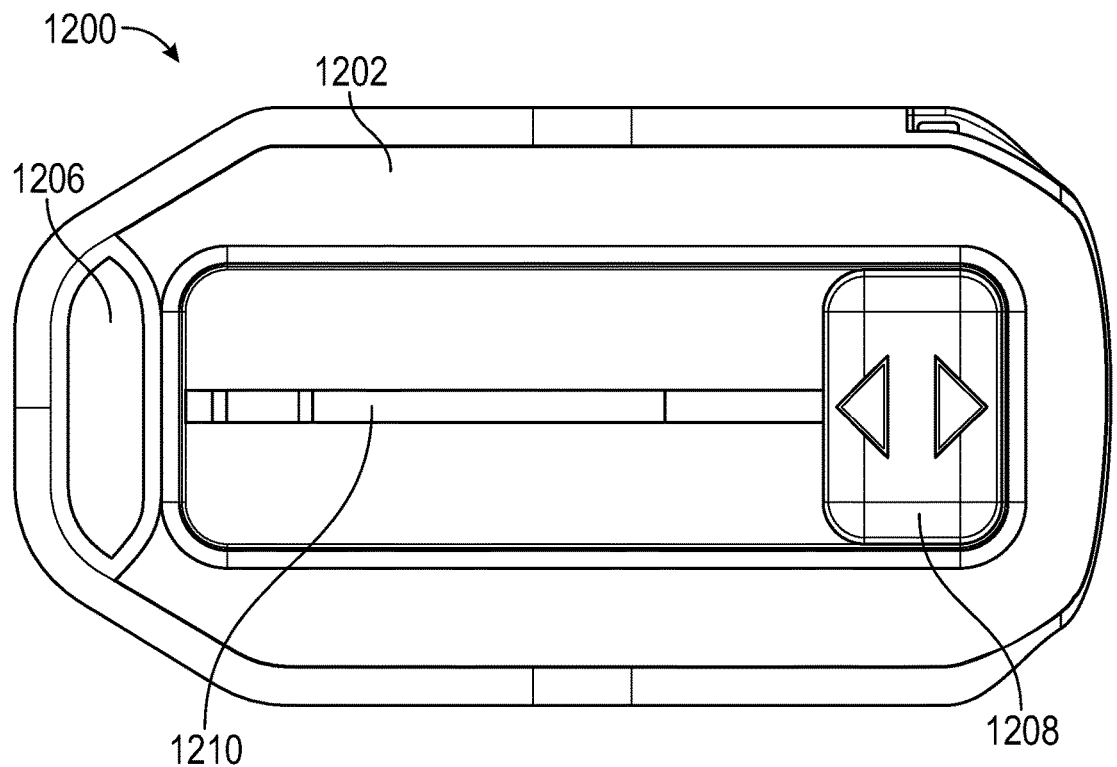
FIG. 14 is a top elevational view of the eyeglasses case of FIG. 12.
Figure 15:
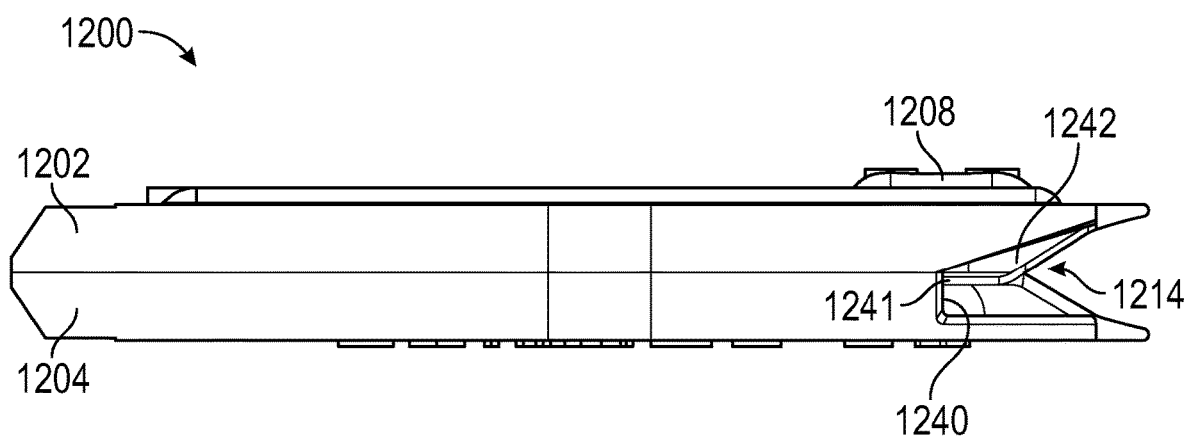
FIG. 15 is a side elevational view of the eyeglasses case of FIG. 12.
Figure 20:
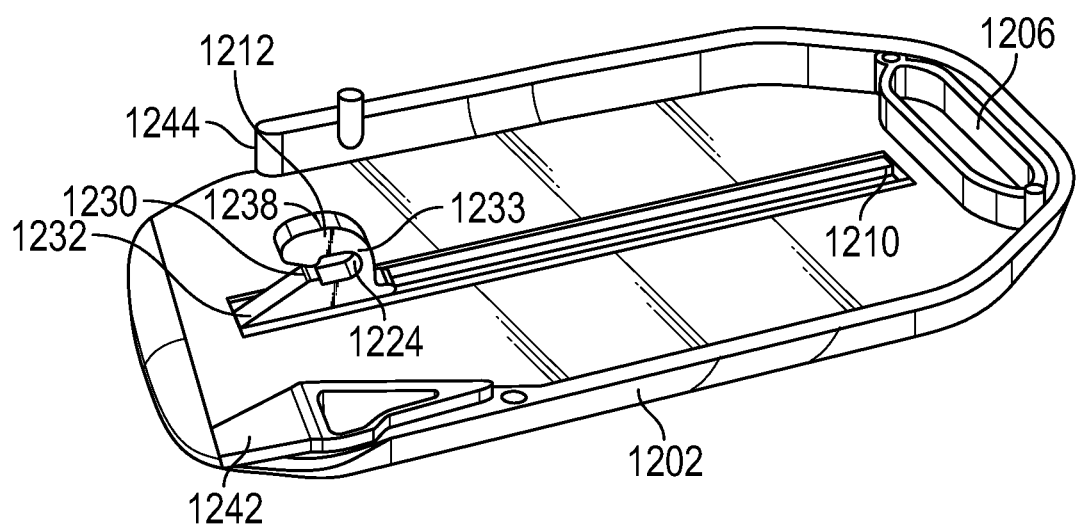
FIG. 20 is a perspective view of the top half of the eyeglasses case of FIG. 12.
Figure 21A:
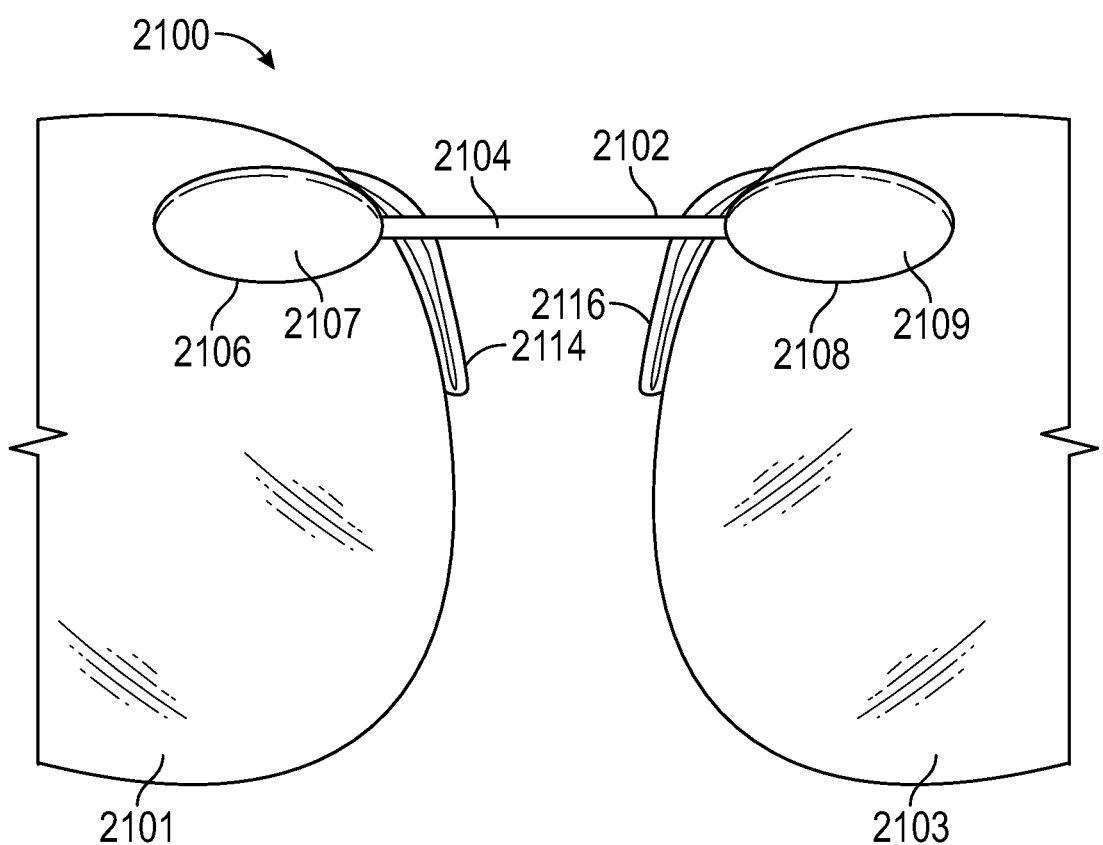
FIG. 21A is an elevational view of a portion of eyeglasses according to another embodiment of the invention.
Figure 21B:
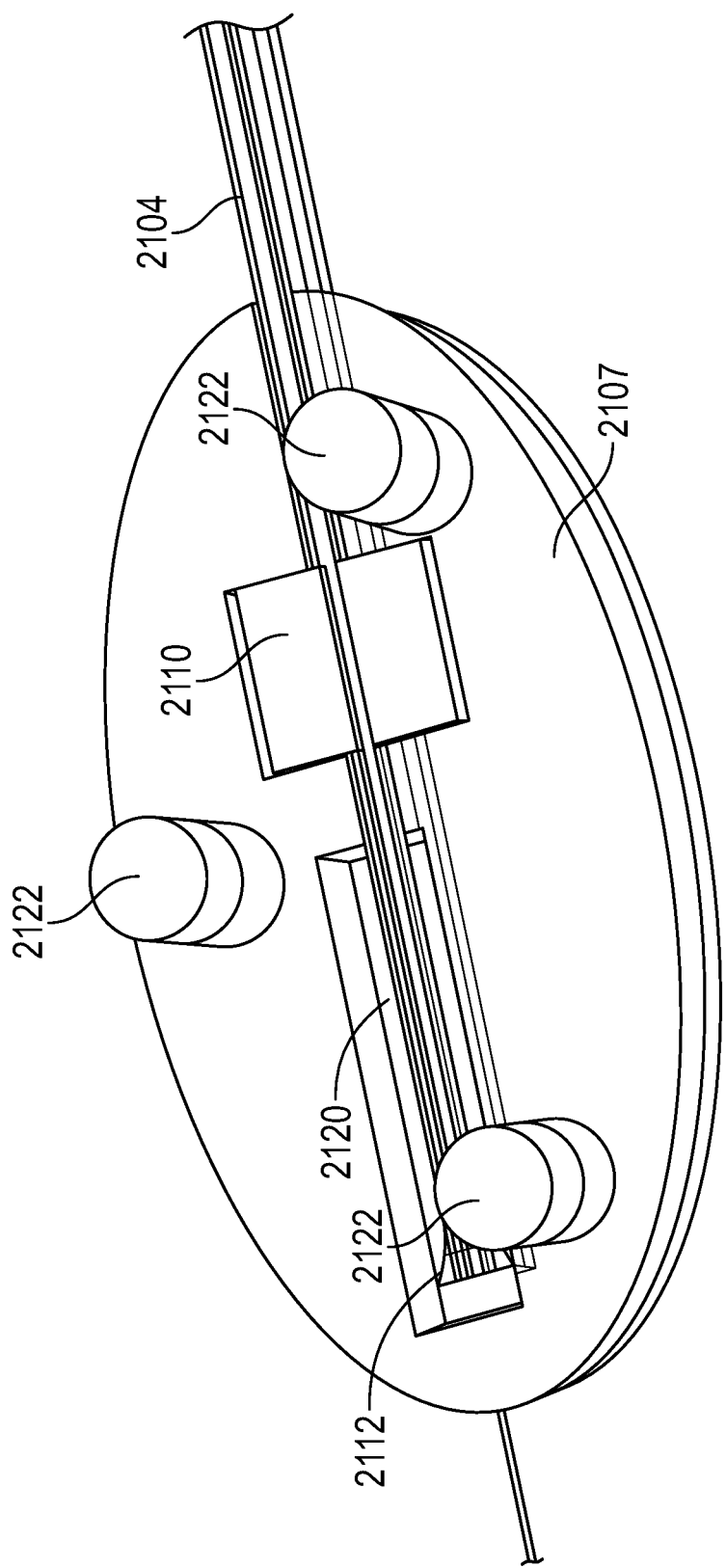
FIG. 21B is a detail of a portion of the eyeglasses of FIG. 21A.

In the configuration shown in FIGS. 12 and 20, actuator 1208 is in its forward-most position, which places clasp 1212 adjacent opening 1214. As shown in FIG. 20, clasp 1212 has an engagement surface 1224 adapted to engage the bendable bridge 1222 of eyeglasses 1216. An opening 1230 on the front side of clasp 1212 provides access to the engagement surface 1224, and a ramp 1232 helps move the bridge 1222 through opening 1230 toward the engagement surface 1224. Optional detents 1234 and 1236 are formed in the interior surface of bottom portion 1204 to serve as stop elements for the clasp 1212 in its most forward and most retracted positions to prevent unintended release of the eyeglasses. Clasp 1212 is formed from polycarbonate or other polymer, and has a thinner portion 1233 that bends upon engagement of a bottom edge 1238 of the clasp (shown as the top in the inverted view of FIG. 20) with the interior surface of the lower portion 1204 of the case. When actuator 1208 and clasp 1212 are moved away from opening 1214, the bottom edge 1238 of clasp 1212 moves out of detent 1234, and it enters detent 1236 when the clasp is fully retracted. In some optional embodiments, the top to bottom interior height of case 1200 is greater at opening 1214 than at the other end of the case to cause clasp 1212 to bend and reduce the size of opening 1214, thus securely grasping the bridge of the eyeglasses.

Figure 16:
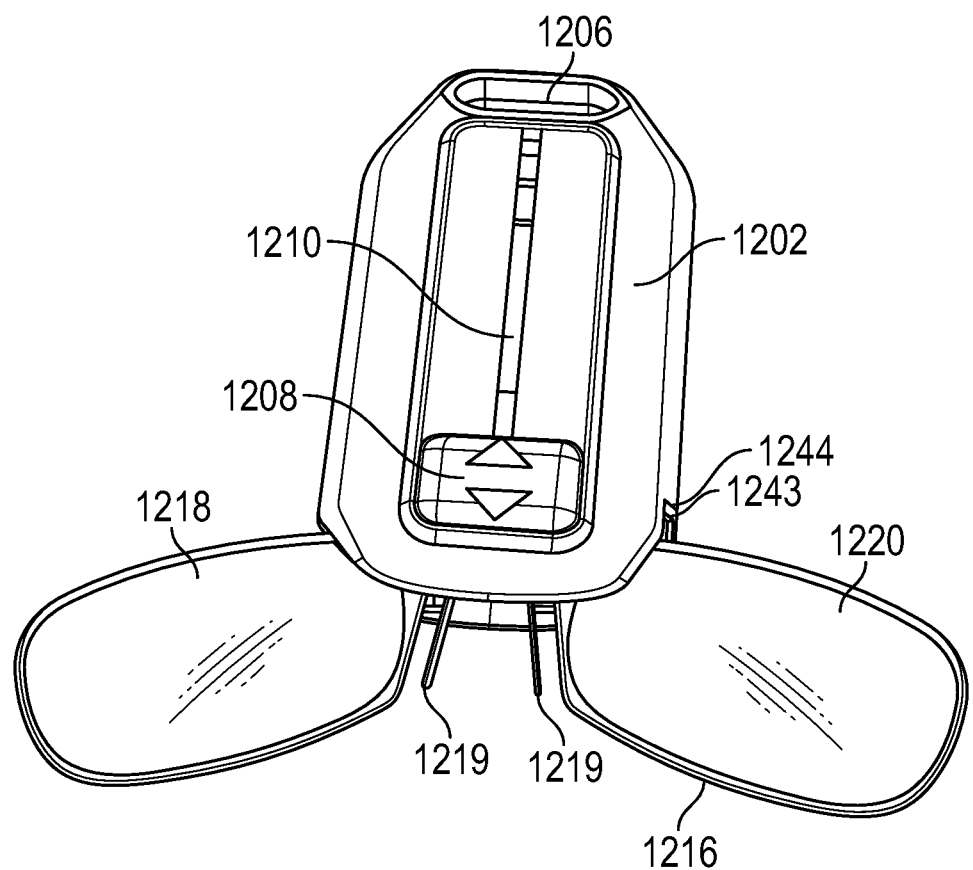
FIG. 16 is a perspective view of the eyeglasses case of FIG. 12 during insertion of eyeglasses.
Figure 17:
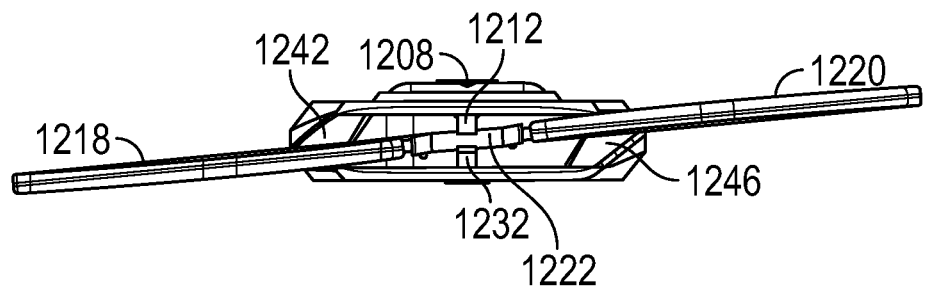
FIG. 17 is an end view of the eyeglasses case of FIG. 12 during insertion of eyeglasses.
Figure 18:
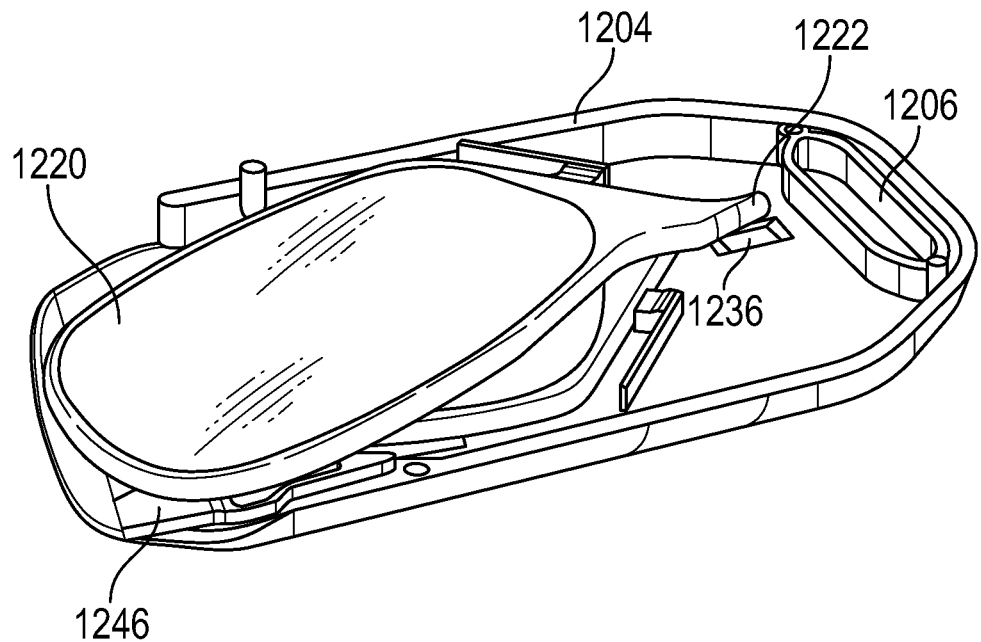
FIG. 18 is a perspective view of a bottom half of the eyeglasses case of FIG. 12 storing a pair of eyeglasses.
Figure 19:
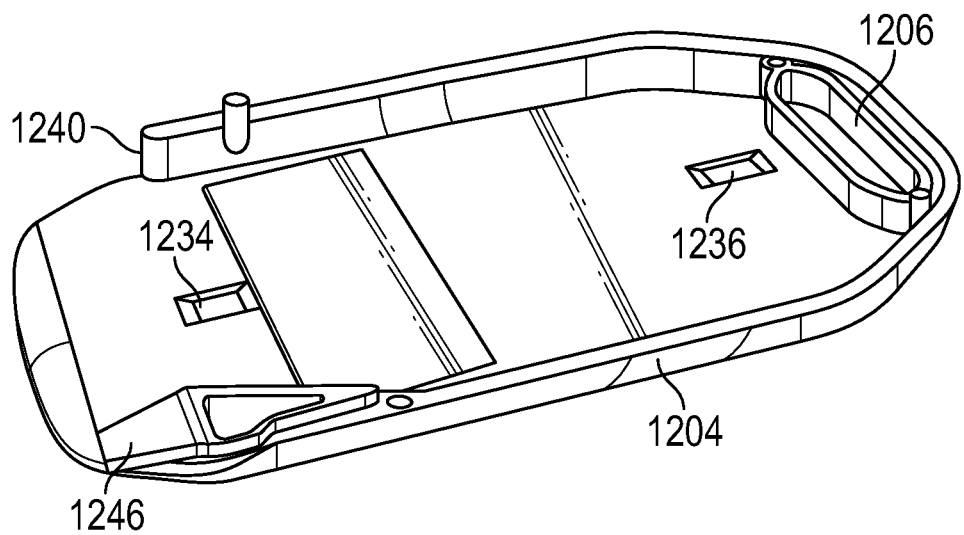
FIG. 19 is a perspective view of the bottom half of the eyeglasses case of FIG. 12 without eyeglasses.

The eyewear system of this invention is designed to fold the eyeglasses as the eyeglasses are inserted into the case. FIGS. 16 and 17 show eyeglasses 1216 at opening 1214 of case 1200 just prior to insertion. In these figures, actuator 1208 is in its forward-most position. During insertion, the top portion of eyeglasses 1216 engages a folding guide 1241 formed in part by a bearing surface 1240 on one side of opening 1214 and a corresponding folding guide 1243 formed in part by bearing surface 1244 on the other side of opening 1214. Guide 1241 also includes a tapered surface 1242 which is tapered down, and guide 1243 includes a tapered surface 1246 which is tapered up, so that their corresponding bearing surfaces are offset, thereby guiding lens 1218 down toward the bottom of the case and lens 1220 up towards the top of the case as the eyeglasses are inserted, as shown in FIG. 17. In the configuration shown in FIGS. 16 and 17, bendable bridge 1222 has moved up ramp 1232 and through opening 1230 to engage the engagement surface 1224 of clasp 1212. As actuator 1208 is moved back, surface 1238 of clasp 1212 (shown in FIG. 20) engages the bottom surface of case portion 1204, which causes clasp 1212 to bend around bridge 1222 and as it pulls eyeglasses 1216 into the case. Because the lenses 1218 and 1220 are offset, the lenses fold over each other within the case as the bridge is pulled back and as the top edge of the eyeglasses engage the bearing surfaces, resulting in the stored configuration shown in FIG. 18. The case contacts the eyeglasses only on the outside edge, and the lenses move around each other as they fold, thereby preventing scratching of the lenses. To retrieve the eyeglasses from the case, the actuator 1208 is slid forward in track 1210 to present the eyeglasses to a user in the configuration shown in FIG. 16.

FIGS. 21-24 illustrate yet another aspect of the invention. The eyeglasses 2100 have lenses 2101 and 2103 and a continuously variable width foldable bridge 2102. A flat superelastic (formed, e.g., from Nitinol wire, 0.4 mm thick, 0.8 mm wide) bridge wire 2104 is held at both ends by bridge holders 2106 and 2108, each having a cover 2107 and 2109, respectively. Inside each bridge holder, as shown in the view of the underside of cover 2107 in FIG. 21B, bridge wire 2104 is in tight sliding relationship with a friction element 2110, made from silicone or other suitable friction material and disposed in a cavity in the underside of cover 2107. A crimp or other stop 2112 at the ends of bridge wire 2104 slides within a slot 2120 and insures that the bridge wire does not come out of the bridge friction element 1210 and cover 2107. The user can push or pull the lenses with respect to each other to adjust the bridge width, and the friction in the bridge guides maintains the bridge width thereafter. The bridge guides are attached to the lenses via, e.g., pins 2122 that are heat staked through holes in the lenses. The lenses have suitable nose pads 2114 and 2116, such as those shown or such as the cantilevered nose pads described above. The user adjusts the nose bridge by pushing or pulling the lenses with respect to each other such that when they are worn on their face the top of the lenses are level as in FIG. 23 and the nose pads engage the top of the nose with appropriate force. The friction elements described above maintain this optimal bridge length between the lenses when the glasses are stored or retrieved for usage.

Figure 22:
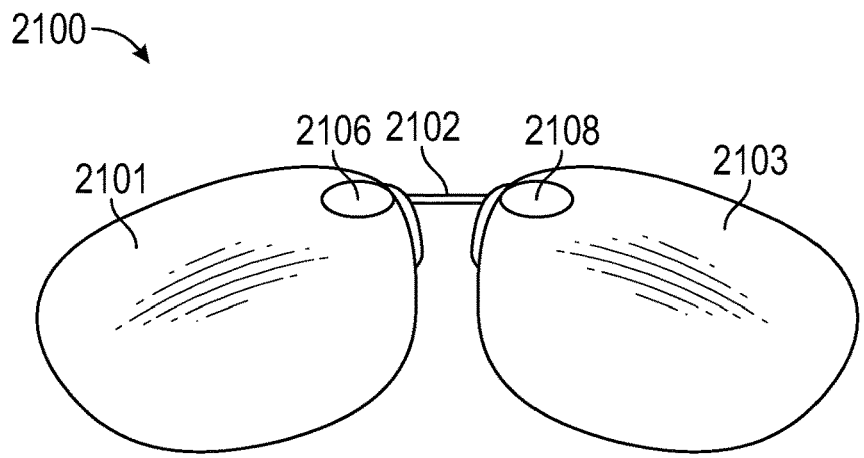
FIG. 22 is an elevational view of the eyeglasses of FIG. 21A in their at-rest configuration.
Figure 23:
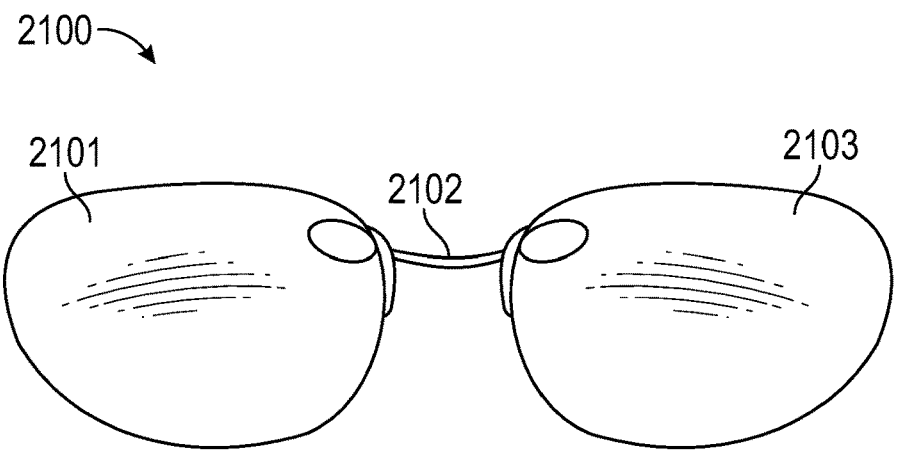
FIG. 23 is an elevational view of the eyeglasses of FIG. 21A in their as-worn configuration.
Figure 24:
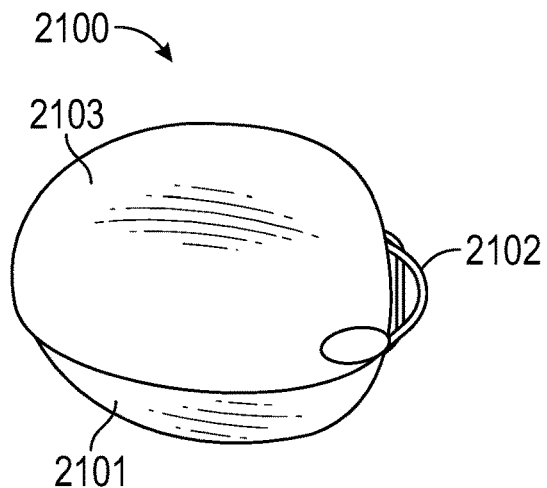
FIG. 24 is an elevational view of the eyeglasses of FIG. 21A in their stored configuration.

Eyeglasses 2100 may be used together with one of the eyeglasses cases described above. FIG. 22 shows eyeglasses 2100 in their at-rest position. FIG. 23 shows eyeglasses 2100 with bridge 2102 bent to its as-worn position. FIG. 24 shows eyeglasses 2100 in their folded and stored configuration in, e.g., a folding case such as the ones described above.

Figure 25:
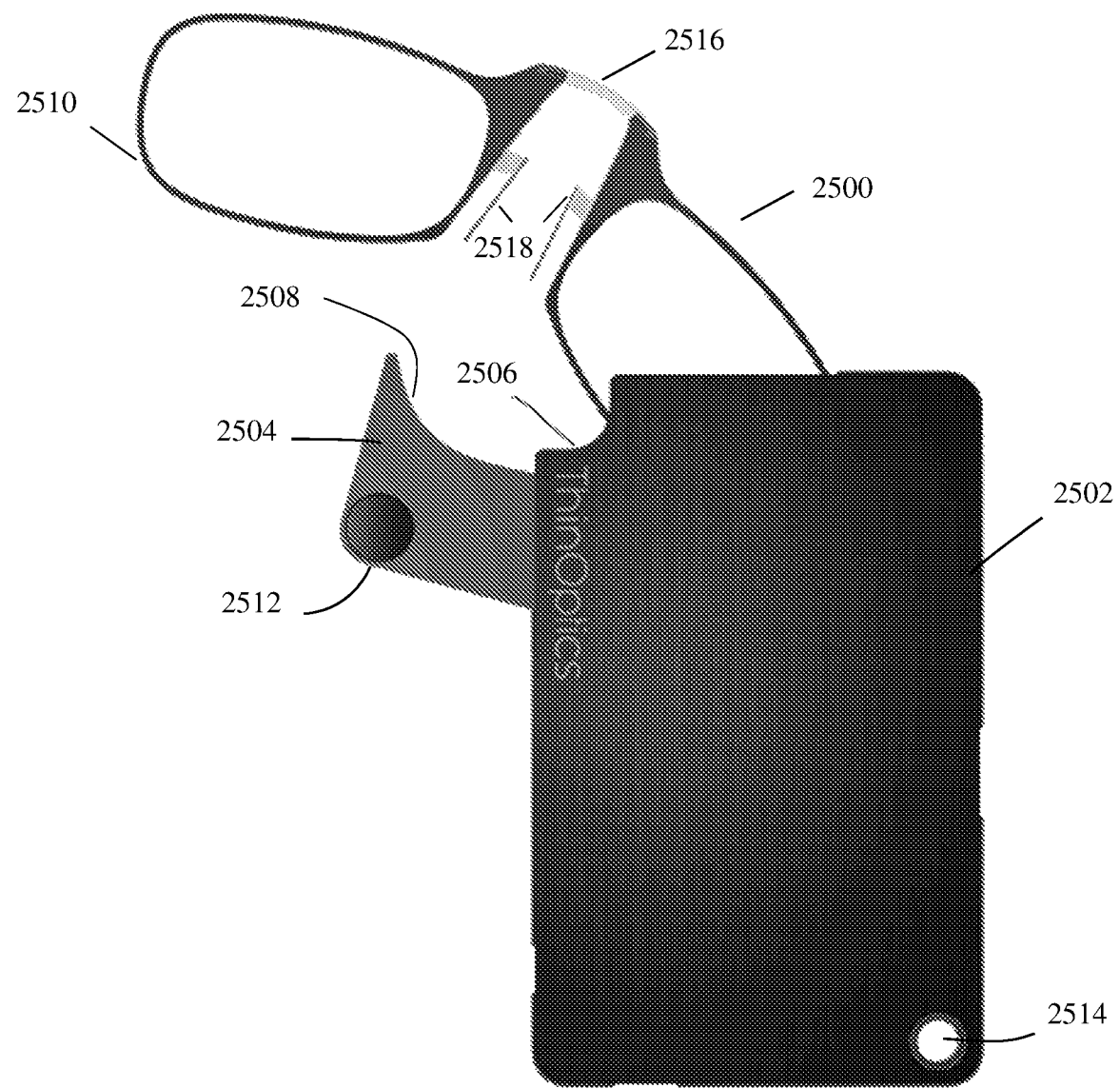
FIG. 25 is an elevational view of embodiments of eyeglasses being inserted into a case.

FIGS. 25-29 illustrate another aspect of the invention. These figures depict a card case configured to store the eyeglasses disclosed herein. FIG. 25 illustrates eyeglasses 2500 being inserted into case 2502. The case 2502 comprises a door 2504 configured to open to allow insertion of the eyeglasses 2500 through the insertion aperture 2506. The eyeglasses 2500 can be inserted as shown in FIG. 25, with the bridge 2516 and the top portion of the eyeglasses being positioned farther from the door and the bottom of the eyeglasses near the nose pads 2518 being positioned nearer the door 2504. Once the eyeglasses have been inserted sufficiently far for engaging surface 2508 to engage with engaging portion 2510 of the eyeglasses 2500, the door 2504 can be used to complete insertion of the eyeglasses 2500 into the case 2502 by moving the door 2504 towards a closed position, shown in FIGS. 26A-C and FIG. 29. The door 2504 comprises a button 2512 that can be used to manipulate the position of the door 2504. The case 2502 also comprises an opening 2514 that can be used in various carrying schemes. For example, the opening 2514 can be used to put the case 2502 on a keychain, lanyard, wristband, etc.

Figure 26A:
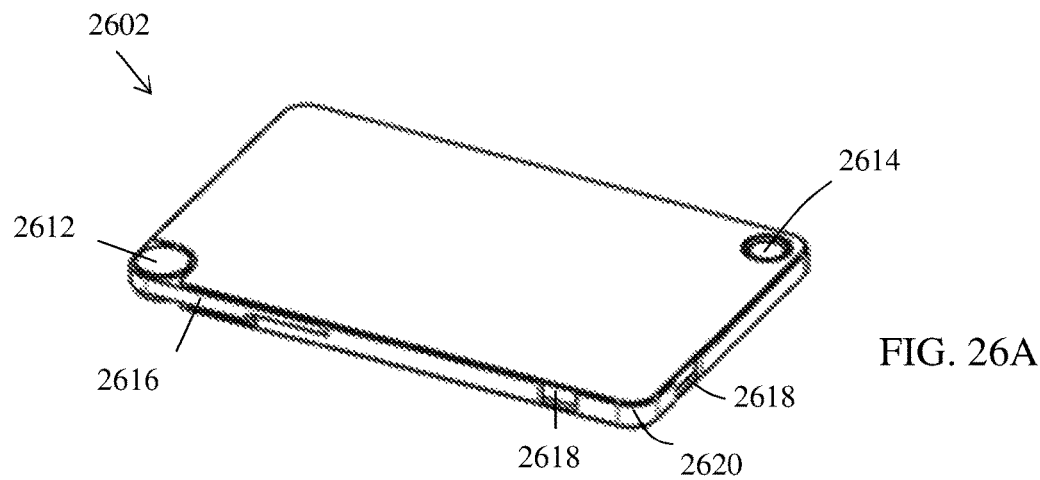
FIGS. 26A-C are various views of an embodiment of a case.
Figure 26B:
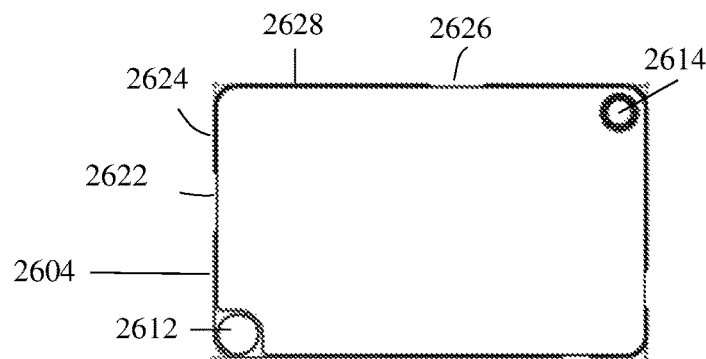
Figure 26C:
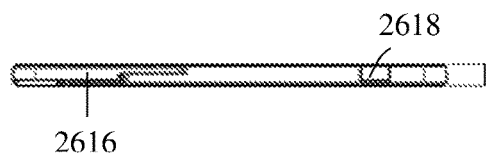
Figure 27:
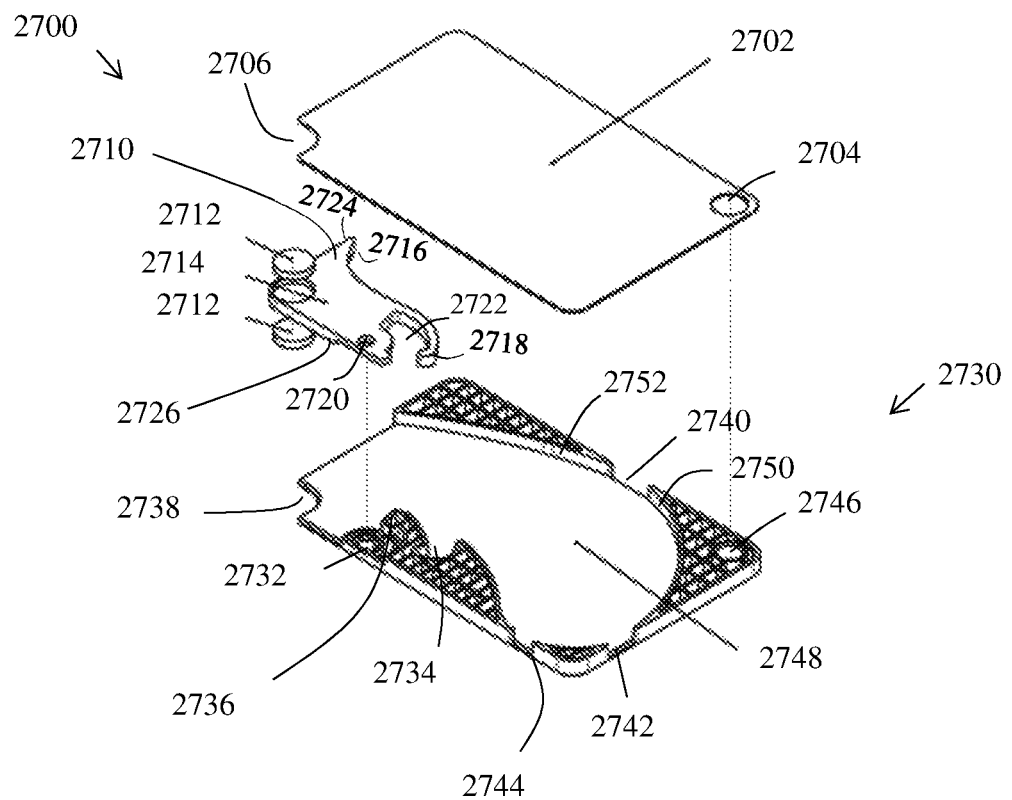
FIG. 27 is an exploded perspective view of components of the case of FIGS. 26A-C.

FIGS. 26A-C depict various views of a case 2602 in a closed position. The case comprises a button 2612, shown in the perspective view of FIG. 26A and the top view of FIG. 26B, that can be used to manipulate the position of the door. In the closed position, only the button 2612 and side edge 2616 of the door are externally visible and the remaining portions of the door are positioned within the case. The side edge 2616 of the door is also shown in the side view of FIG. 26C. FIGS. 26A and 26B also show the opening 2616 that can be used in various carrying schemes described above. The case 2602 comprises various openings 2618 along its edge that allow for the eyeglasses to extend or overflow past the internal dimensions of the case, but remain within the external dimensions of the case. In some embodiments, the case 2602 comprises 4 openings 2618. Other amounts (1, 2, 3, 5, 6, 7, 8, 9, or more) are also possible. First and second openings 2618 are positioned along side edges of the case on either side of a first corner 2620. A third opening 2622 can be positioned along the side edge 2624 of the case adjacent to the door 2604. A fourth opening 2626 can be positioned along the edge 2628 of the case.

In some embodiments, the thickness 2630 of the case can be about 3-5 mm. in some embodiments, the thickness is about 4.5 mm. The thickness of the case can be less than about 5 mm, less than about 4.8 mm, or less than about 4.6 mm. A length of the case can be about 70-100 mm. In some embodiments, the length is about 80-90 mm. In some embodiments, the thickness is about 85 mm. In some embodiments, the thickness is about 85.5 mm. A width of the case can be about 40-70 mm. In some embodiments, the width is about 50-60 mm. In some embodiments, the width is about 54 mm. In some embodiments, the width is about 53.9 mm. The case can have a generally rectangular shape. In some embodiments, the case can have rounded corners for ease of handling. The case can be sized to approximate the size of a credit card and can be configured to fit within a credit card slot of a wallet, purse, money clip, etc.

Figure 29:
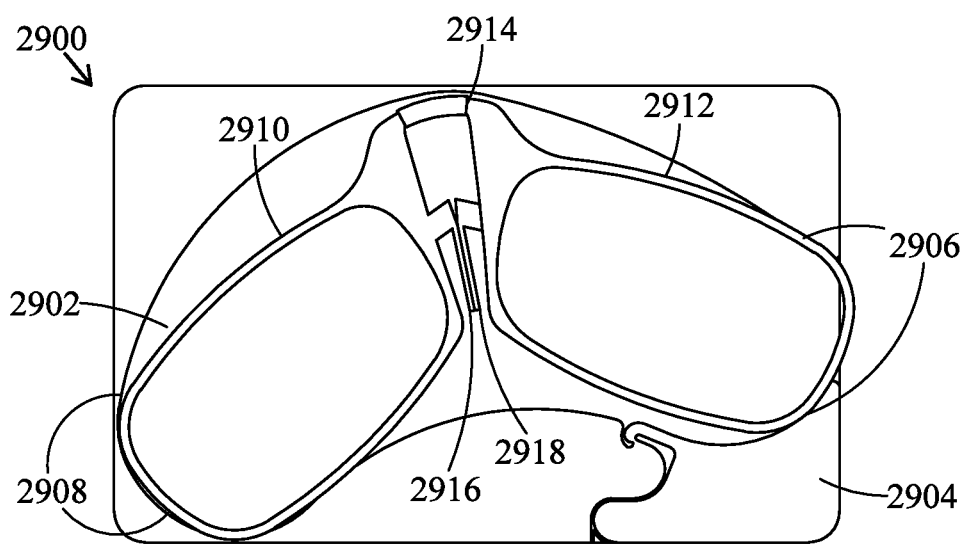
FIG. 29 is an elevational internal view of embodiments of eyeglasses being stored within a case.

FIG. 27A illustrates an exploded view of the components of the case 2700. Top portion 2702 of the case comprises a generally rectangular shaped sheet with rounded corners. Opening 2704 allows for various carrying schemes as described herein. Notch 2706 cut away from a corner of the top portion 2702 allows access to the button 2712 of the door 2710. The button 2712 comprises top and bottom portions attached at opening 2714. The button 2712 having top and bottom portions allows a user to easily grip the button between a thumb and finger (e.g., index finger). The door 2710 comprises side 2724 and side 2726 which form external edges of the case. The door 2710 also comprises engagement surface 2716 shaped to engage an edge of the eyeglasses and urge them into the case upon closing of the door. Aperture 2720 interacts with a protrusion 2732 on a bottom portion 2730 of the case and allows the door to hinge or rotate about protrusion 2732. The door 2710 may comprise features configured to interact or mate with features of the bottom portion 2730 and hold the door 2710 in a closed position. For example, gap 2722 of the door can be configured to mate with peninsula 2736 of the bottom portion 2730. Hook portion 2718 of the door can be configured to mate with notch 2734 of the bottom portion 2730. The bottom portion 2730 of the case comprises a main depression 2748 configured to receive a pair of eyeglasses. The shape of this depression 2748 can resemble a kidney bean shape. This depression forms the internal storage area of the case. The placement and curve of the surfaces 2750, 2752 can function as guides configured to properly position the eyeglasses upon their insertion into the case. These surfaces can also be used to apply force to the glasses during insertion to urge them into a stored configuration (FIG. 29). The bottom portion 2730 of the case also has openings 2740, 2724, 2744 configured to allow eyeglasses to extend past the internal dimensions of the case. A fourth opening, described above, is formed by the interaction of the door 2710 and the bottom portion 2730. The bottom portion 2730 also comprises aperture 2746 configured to allow various carrying schemes, as described above.

Figure 28:
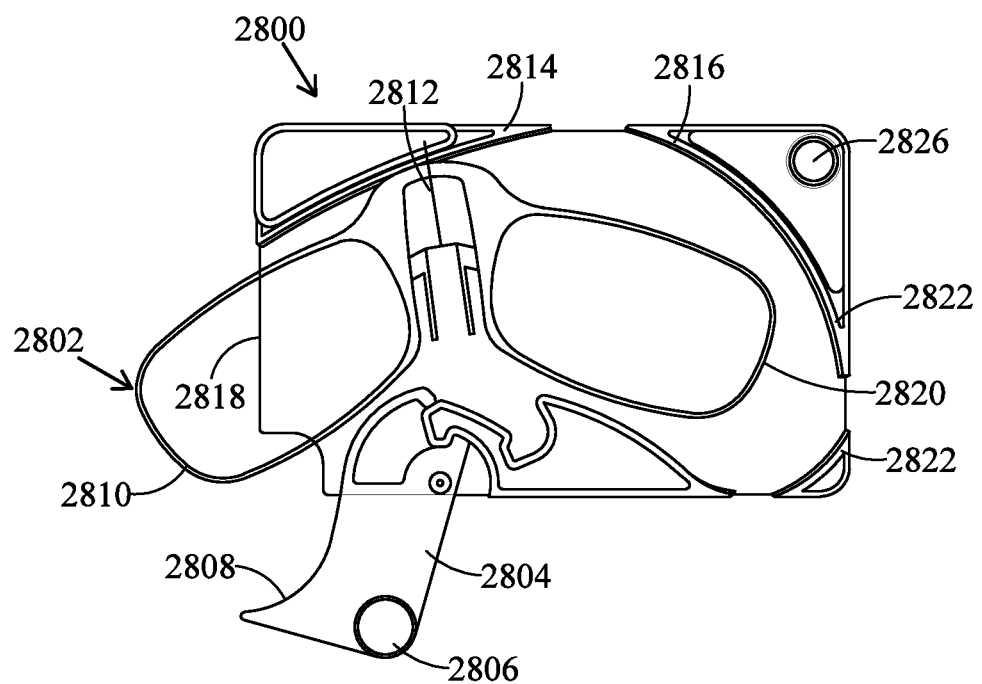
FIG. 28 is an elevational view of embodiments of eyeglasses being inserted or removed from a case.

FIG. 28 shows an embodiment of a case 2800 and eyeglasses 2802 with the eyeglasses being inserted into (or being removed from) the case. This figure is similar to FIG. 25, but the current figure shows the eyeglasses and internal components within the case. The case 2800 comprises door 2804, which is shown in the open position, allowing passage of eyeglasses 2802 through opening 2818 formed between surface 2814 and surface 2808. The eyeglasses 2802 can be inserted through this opening by a user far enough to allow the engaging surface 2808 of the door to engage edge 2810 of the eyeglasses. At this point, closing the door 2804 will urge the eyeglasses 2802 into the case 2800. As shown in FIG. 28, the top surfaces 2814, 2816 of the case 2800 can function as a guide along which bridge 2812 of the eyeglasses 2810 can slide during insertion of the eyeglasses. The bridge 2812 can travel along this path created by surface 2814, 2816 until the edge 2820 of the eyeglasses encounters resistance from side surfaces 2822 of the case (FIG. 29). The inner surfaces of the case can serve as guides ensuring proper positioning of the eyeglasses within the case. Because the eyeglasses are held in the case against the spring force of the bridge, opening the door can cause the eyeglasses to pop out, as shown in FIG. 28. FIG. 28 also shows aperture 2826 that can be used in various carrying schemes (e.g., keychain, lanyard, wristband, etc.).

FIG. 29 shows an embodiment of a case 2900 with a pair of eyeglasses 2902 in the stored configuration within the case 2900. The door 2904 of the case 2900 is shown in a closed position. The inner surfaces 2908 and the opposing inner surfaces 2906 provide the force to bias the eyeglasses into a stored configuration. In the stored configuration, the first lens 2910 and the second lens 2912 of the eyeglasses are moved towards one another. The movement can be described as rotation of the lenses towards one another and about a midpoint of the bridge 2914. The movement brings the first and second lenses 2910, 2912 towards one another and the first and second nosepads 2916, 2918 towards one another. In some embodiments, the first and second nosepads 2916, 2918 are touching in a stored configuration. The bending or rotation of the lenses occurs within a single plane. This rotation allows the stored eyeglasses to maintain a very thin footprint.

In the stored configuration, the length of the eyeglasses is reduced as compared to the at rest configuration. In some embodiments, the length of the eyeglasses in the at rest configuration is about 108 mm. Other lengths are also possible (e.g., about 100-120 mm, about 110 mm, about 105-115 mm, etc.) In some embodiments, the length of the eyeglasses in the stored configuration is about 80-90 mm. In some embodiments, the length of the eyeglasses in the stored configuration is about 85.5 mm. In the stored configuration, the width of the eyeglasses is increased as compared to the at rest configuration. The width of the eyeglasses can be about 35 mm in the at rest configuration. Other widths are also possible (e.g., about 30-40 mm, about 32-38 mm, etc.). In some embodiments, the width of the eyeglasses in the stored configuration is about 50-60 mm. In some embodiments, the width of the eyeglasses in the stored configuration is about 54 mm. In some embodiments, the thickness of the eyeglasses does not change between the at rest and stored configurations. The thickness can be less than about 3 mm.

In some embodiments, an internal storage volume of the case is less than about 9 ml. In some embodiments, the internal storage volume is about 7-10 ml. In some embodiments, the internal storage volume is about 7-9 ml. In some embodiments, the internal storage volume is about 8 ml. The internal storage volume can be about 8.14 ml. In some embodiments, the internal storage area has a surface area (e.g., surface area of a bottom portion of the internal storage area) of about 2800 mm$^2$. Other surface areas are also possible (e.g., 2600-3000 mm$^2$, 2700-2900 mm$^2$, 2500-3100 mm$^2$, etc.).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An eyewear system comprising eyeglasses and a case,
the eyeglasses comprising a first lens, a second lens, and a bendable bridge disposed between the first lens and second lens, the bendable bridge comprising a spring providing a spring force when the bridge is bent from a rest position,
the eyeglasses being adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration, the case comprising a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case comprises a thickness of less than about 5 mm and a length of less than about 90 mm, wherein the guides comprise a first guide having a first bearing surface adapted to engage a first side of the eyeglasses and a second guide having a second bearing surface adapted to engage a second side of the eyeglasses opposite to the first side during insertion of the eyeglasses into the case and closing the door, wherein the second bearing surface comprises an inner surface of the door.

2. The eyewear system of claim 1 wherein the first bearing surface is on a side opposing the opening.

3. The eyewear system of claim 1, wherein the second bearing surface comprises an inner surface of the case adjacent the door.

4. The eyewear system of claim 1, further comprising another guide comprising a curved surface configured to engage the bridge and guide the eyeglasses to their storage position upon insertion of the eyeglasses into the case.

5. The eyewear system of claim 1, wherein the case comprises one or more openings around a perimeter of the case through which the eyeglasses protrude while in a stored configuration while still remaining within an external footprint of the case.

6. The eyewear system of claim 5, wherein the case comprises four openings around the perimeter of the case through which the eyeglasses protrude while in a stored configuration while still remaining within an external footprint of the case.

7. The eyewear system of claim 1, wherein a width of the case is less than about 55 mm.

8. The eyewear system of claim 1, wherein the case comprises an internal storage area for receiving the eyeglasses.

9. The eyewear system of claim 8, wherein the internal storage area has a volume of less that about 9 ml.

10. The eyewear system of claim 8, wherein the internal storage area has a surface area of about 2700-2900 mm$^2$.

11. The eyewear system of claim 1, wherein the case has a generally rectangular shape.

12. The eyewear system of claim 1, wherein the door comprises a hook feature configured to interact with a notch feature of the case.

13. A method of storing eyeglasses in a case, the eyeglasses comprising a first lens, a second lens, and a bendable bridge disposed between the first lens and second lens, the bendable bridge comprising a spring providing a spring force when the bridge is bent from a rest position, the method comprising:
  inserting the eyeglasses through an opening into the case such that the first lens is inserted first;
  moving the eyeglasses far enough inside the case for an engaging surface of a door of the case to engage an outside edge of the second lens; and
  closing the door, thereby engaging first and second sides of the eyeglasses with first and second guides during the moving step to bend the bendable bridge against its spring force to fold the eyeglasses into a stored configuration in which the first and second lenses rotate toward one another about a midpoint of the bendable bridge while remaining in a same plane.

14. The method of claim 13 further comprising engaging the bridge with a curved guide inside the case during insertion of the eyeglasses.

15. The method of claim 13, further comprising opening the door, thereby causing the eyeglasses to pop out of the case.

16. The method of claim 15, wherein opening the door comprises grasping a button on the door.

17. The method of claim 13, wherein the case comprises a thickness of less than about 5 mm.

18. The method of claim 13, wherein the case comprises a length of less than about 90 mm.

19. The method of claim 13, wherein closing the door comprises extending portions of the eyeglasses through apertures around a perimeter of the case.

20. An eyewear system comprising eyeglasses and a case,
  the eyeglasses comprising a first lens, a second lens, and a bendable bridge disposed between the first lens and second lens, the bendable bridge comprising a spring providing a spring force when the bridge is bent from a rest position,
  the eyeglasses being adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration,
  the case comprising a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case comprises a thickness of less than twice the thickness of the eyeglasses and a length of less than the length of the eyeglasses, and wherein the case is configured to store the eyeglasses in their stored configuration such that the first and second lens are not overlapping.

21. The system of claim 20, wherein the length of the case is less than or equal to about 100 mm.

22. The system of claim 20, wherein the length of the case is less than or equal to about 95 mm.

23. The system of claim 20, wherein the length of the case is less than or equal to about 90 mm.

24. The system of claim 20, wherein the length of the case is less than or equal to about 80 mm.

25. The system of claim 20, wherein the length of the case is about 70-100 mm.

26. The system of claim 20, wherein the thickness of the case is less than about 5 mm.

27. The system of claim 20, wherein the thickness of the case is less than about 4.8 mm.

28. The system of claim 20, wherein the thickness of the case is about 4.5 mm.

29. The system of claim 20, wherein a width of the case is about 40-60 mm.

30. The system of claim 20, wherein a width of the is substantially greater than a width of the eyeglasses in the rest position.

31. The system of claim 20, wherein a width of the case is greater than about 40 mm.

32. The system of claim 20, wherein a width of the case is greater than about 50 mm.

33. The system of claim 20, wherein a width of the case is about 50-60 mm.

34. An eyewear system comprising eyeglasses and a case,
the eyeglasses comprising a first lens, a second lens, and a bendable bridge disposed between the first lens and second lens, the bendable bridge comprising a spring providing a spring force when the bridge is bent from a rest position,
the eyeglasses being adapted to move from a wearable configuration in which the bendable bridge is in a rest position and the first lens and second lens are in a first state, not moved towards one another to a stored configuration in which the first and second lenses are moved towards one another, the bendable bridge being bent from its rest position in the stored configuration,
the case comprising a door and an opening through which the eyeglasses pass during insertion and guides sized and configured with respect to the eyeglasses to engage and move the first lens towards the second lens against spring force of the bridge to the stored configuration during insertion of the eyeglasses and closing of the door, wherein the case is configured to store the eyeglasses in their stored configuration such that the first and second lens are not overlapping and such that a length of the eyeglasses is reduced in the stored configuration.

35. The eyewear system of claim 1, wherein the case is sized to fit within a wallet.

* * * * *